United States Patent
Hsu et al.

Patent Number: 5,495,037
Date of Patent: Feb. 27, 1996

[54] LIQUID CRYSTALLINE POLYMER HAVING A POLYSILOXANE BACKBONE

[75] Inventors: Chain-Shu Hsu; Yi-Jing Leu; Li-Jen Shih; Ging-Ho Hsiue, all of Hsinchu, Taiwan

[73] Assignee: National Science Council, Taipei, Taiwan

[21] Appl. No.: 304,092

[22] Filed: Sep. 9, 1994

[51] Int. Cl.⁶ .............................. C07F 7/08; C08G 77/04
[52] U.S. Cl. .............................................. 556/441; 528/26
[58] Field of Search ................................ 556/441; 528/26

[56] References Cited

U.S. PATENT DOCUMENTS

| | | | |
|---|---|---|---|
| 4,865,762 | 9/1989 | Kreuder et al. | 528/26 |
| 4,924,020 | 5/1990 | Okawa et al. | 556/441 |
| 4,981,607 | 1/1991 | Okawa et al. | 528/26 X |
| 5,098,978 | 3/1992 | Riepl et al. | 528/26 X |
| 5,138,010 | 8/1992 | Keller et al. | 528/26 |
| 5,144,055 | 9/1992 | Muller et al | 528/26 X |
| 5,211,877 | 5/1993 | Andrejewski et al. | 528/26 X |
| 5,264,517 | 11/1993 | Endo et al. | 528/26 |
| 5,281,685 | 1/1994 | Morita et al. | 528/26 |
| 5,348,684 | 9/1994 | Hemmerling et al. | 556/441 X |
| 5,380,915 | 1/1995 | Morita et al. | 528/26 X |

OTHER PUBLICATIONS

"Synthesis and Characterization of Ferroelectric Liquid Crystalline Polysiloxanes and Polymethacrylates Containing [(S)-2-Methyl-1-1-butoxylphenyl 4-(Alkyloxy)biphenyl-4'-carboxylate Side Groups", Chain-Shu Hsu, et al., Macromolecules, vol. 25, No. 26, 1992, pp. 7126-7134.

"Synthesis of Liquid Crystalline Polysiloxanes and Polymethacrylates with Broad Temperature Ranges of the Chiral Smectic C Phase", Chain-Shu Hsu, et al., Macromolecules, vol. 26, No. 12, 1993, pp. 3161-3167.

*Primary Examiner*—Paul F. Shaver
*Attorney, Agent, or Firm*—Hitt Chwang & Gaines

[57] ABSTRACT

A side-chain liquid crystalline polysiloxane having the following formula is disclosed:

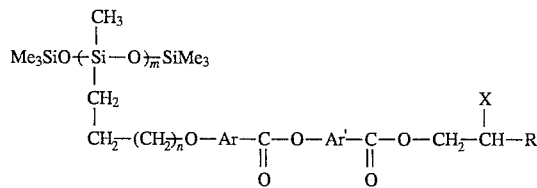

wherein
Me is methyl; m is an integer of 40 to 80; n is an integer of 1 to 12; Ar is phenylene, biphenylene or naphthalene; Ar' is phenylene or naphthalene; X is halogen or methyl; and R is $C_1$–$C_4$ alkyl.

52 Claims, 27 Drawing Sheets

LIQUID CRYSTALLINE POLYMER HAVING A POLYSILOXANE BACKBONE

FIELD OF THE INVENTION

The present invention is related to chiral smectic liquid crystalline polymers, in particular to side-chain chiral smectic liquid crystalline polymers.

BACKGROUND OF THE INVENTION

Recently, the synthesis of liquid crystalline polymers has attracted an increasing interest among various macromolecular compounds, because of their versatile applications, such as liquid crystal display (LCD) devices, optical filtering lens, reflection lens, linear optical polarizing lens (Displ. Technol., 1, 81 (1985)), and stationary phase materials used in high performance chromatography (J. Org. Chem., 49, 4947 (1984)). In addition, researchers have focused on their use as an optical memory material in the fabrication of erasable optical discs, for examples articles published in Mol. Cryst. Liq. Letters., 102, 78 (1984); Mol Cryst. Liq. Cryst., 102, 78(1984).

The potential applications of ferroelectric liquid crystals in fast-switching, high resolution electrooptical devices is well documented. [Clark, N. A. and Lagerwall, S. T. appl. Phys. Lett. 1980, 36,899; Lagerwall, S. T. and Dahl, I. Mol. Crys. Liq. Crys. 1984, 114, 151; Lagerwall, S. T., et al. Mol. Cryst. 1987, 152,503]

A number of ferroelectric liquid crystalline side-chain polymers have been prepared during the past few years. Among them there are liquid crystalline polymers having a backbone based on acrylates or acrylate derivatives [V. P. Shibaev, et al. Polymer Bulletin, 12, 299 (1984); J. C. Dubois, et al. Mol. Cryst. Liq. Cryst., 1986, Vol. 137, pp. 349–364; S. Esselin, et al. Mol. Cryst. Liq. Cryst., 1988, Vol. 155, pp. 371–387; S. Bualek, et al. Mol. Cryst. Liq Cryst., 1988, Vol. 155, pp. 47–56; S. Uchida, et al. Mol. Cryst. Liq. Cryst., 1988, Vol. 155, pp. 93–102; K. Shiraishi et al., Makromol. Chem., 190, 2235–2243 (1989); V. Percec, et al. Journal of Polymer Science: Part A: Polymer Chemistry, Vol. 27, 2367–2384 (1989); S. Esselin, et al. Liquid Crystal, 1987, Vol. 2, No. 4, 505–518; B. Messner, et al. Makromol. Chem. 192, 2383–2390 (1991); E. C. Bolton, et al. Liquid Crystal, 1992, Vol. 12, No. 2,305–318; J. Bomelburg, et al. Makromol. Chem., Rapid Commun. 12, 483–488 (1991); G. Scherowsky, et al. Liquid Crystal, 1991, Vol. 10, No. 6, 809–819], liquid crystalline polymers having a backbone of polylaurates [J. M. Guglieminetti, et al. Polymer Bulletin 16, 411–418 (1986)], liquid crystalline polymers having a backbone based on diazo-compounds or derivatives thereof [R. Zentel, et al. Liq. Cryst., 1987, 2(1), 83–89; S. Bualek, et al. Makromol. Chem., 189, 797–804(1988); H. Kapitza, et al. Makromol. Chem., 189, 1793–1807 (1988); R. Zentel Makromol. Chem., 190, 2869–2884 (1989); H. Kapitza, et al. Makromol. Chem., 192, 1859–1872 ( 1991 ); S. U. Vallerien, et al. Makromol. Chem., Rapid Commun., 10, 333–338 (1989)], liquid crystalline polymers having a backbone of polytartrates [S. Ujiie, et al. Polymer. Journal, Vol. 23, No. 12, pp. 1483–1488 (1991 )], and liquid crystalline polymers having a backbone of polysuccinates [K. Fujishiro, et al. Liquid Crystals, 1992, Vol. 12, No. 4, 561–573]. The above-mentioned liquid crystalline polymers do not have a segment of polysiloxane in the backbones thereof.

B. Hahn, et al. in their articles, Mol. Cryst. Liq. Cryst. Inc. Nonlin. Opt., 1988, Vol. 157, pp. 125–150; and Macromolecules, Vol. 20, No. 12, 1987, disclose liquid crystalline polymers having a backbone of polysiloxane. The mesogenic groups of these liquid crystalline polysiloxanes contain 1,3-dioxanyl. C. Destrade, et al. in their article, Liquid Crystals, 1991, Vol. 10, No. 4, pp. 457–493, disclose liquid crystalline polysiloxanes containing α-chloroalkyl carboxylic acid or aromatic ester of alkyl carboxylic acid mesogenic groups. The present invention is directed to liquid crystalline polysiloxanes containing mesogenic groups of alkyl ester or chloroalkyl ester of aromatic carboxylic acid.

An object of the present invention is to provide novel liquid crystalline polymers.

Another object of the present invention is to provide liquid crystalline polysiloxanes.

Still another object of the present invention is to provide mesogenic monomers for graft polymerizing onto a polysiloxane backbone.

SUMMARY OF THE INVENTION

A liquid crystalline polysiloxane having the following formula (I) is disclosed:

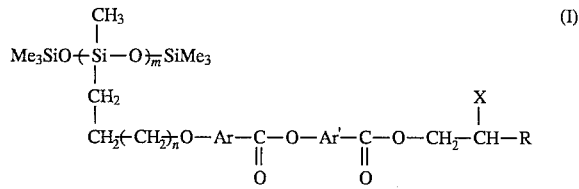

wherein

Me is methyl;

m represents the degree of polymerization of polymer backbone and is an integer of about 40–80;

n represents the spacer between the backbone and the side-chain mesogenic groups and is an integer of about 1–12;

Ar is phenylene, biphenylene, or naphthalene;

Ar' is phenylene or naphthalene;

X is halogen or methyl; and

R is $C_1$–$C_4$ alkyl, such as methyl, ethyl, n-propyl, isopropyl, n-butyl, 1-methylpropyl and 2-methylpropyl.

Preferably, Ar is para-phenylene; 4-,4'-para-biphenylene; or 2-,6-naphthalene.

Preferably, Ar' is para-phenylene or 2-,6-naphthalene.

Preferably, X is chlorine or methyl.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE INVENTION

Figure 1:
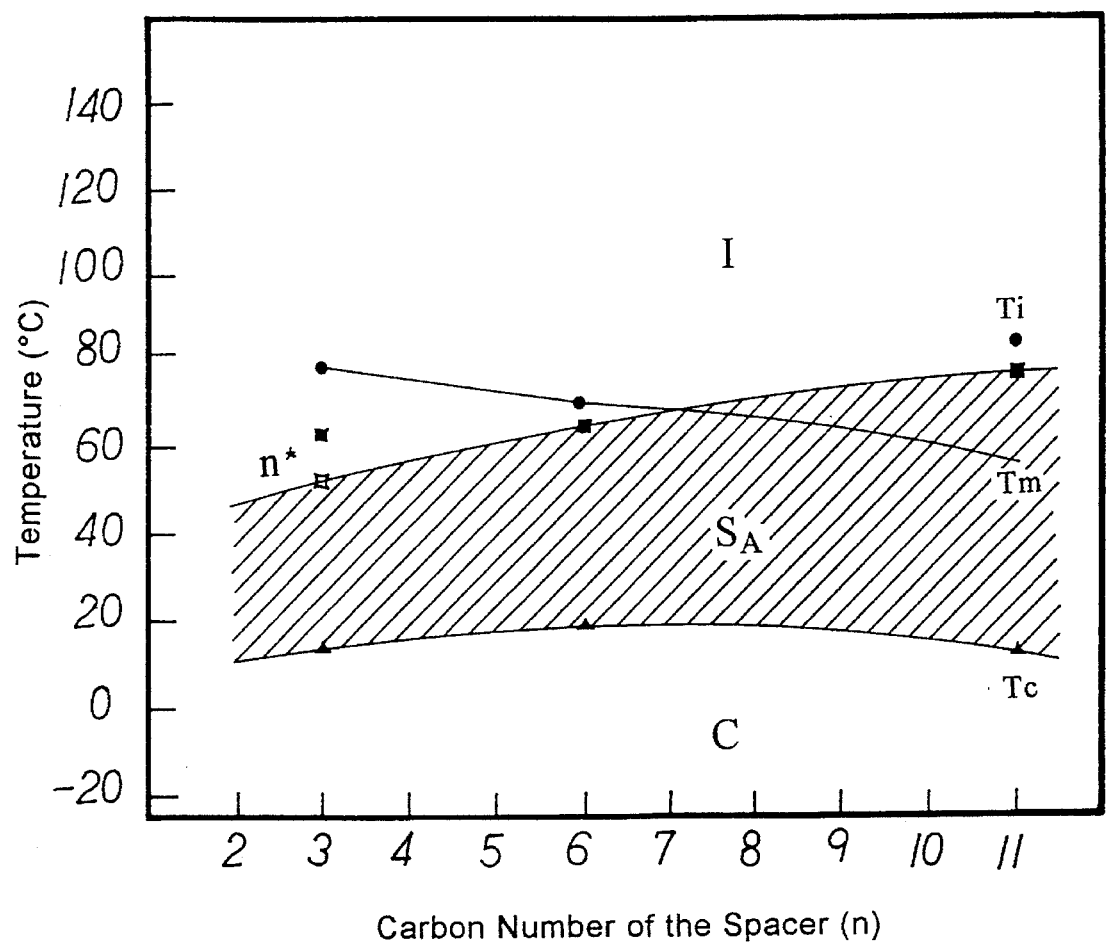
FIG. 1 is a plot which show phase transition behavior of monomers I-10 to I-12 as a function of the length of spacer, wherein ● represents the melting point, Tm; ■ represents the isotropic phase temperature, Ti; ▲ represents the crystallization temperature, Tc; and □ represent the cholesteric phase temperature, N*.

A suitable method of synthesizing the liquid crystalline polymer of the above formula (I) comprises graft polymerizing the following monomer (II):

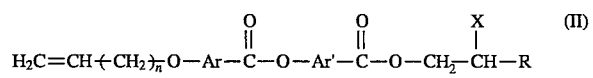

wherein n, Ar, Ar', X and R: are defined same as in the formula (I), onto a polymer backbone having the following formula (III) in a suitable solvent and under suitable reacting conditions:

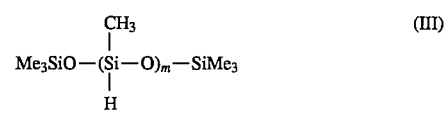

wherein Me and m are defined same as in the formula (I).

Said suitable solvent includes any organic solvent which renders the compounds of the above formulas (I), (II) and (III) soluble or dispersible therein, and does not reacted with the compounds of the above formulas (I), (II) or (III), such as aromatic solvent: benzene, toluene, dimethylbenzene, and the like. The organic solvent is preferably dehydrated to an anhydrous form before use.

Said suitable reacting conditions mainly includes a suitable catalyst and a suitable reacting temperature under which the graft polymerization of the compounds (II) and (III) can be carried out. Said suitable catalyst can be any catalyst which catalyzes the graft polymerization of polymethylhydrosiloxane and monomer having vinyl group, such as platinum-divinyltetramethyldisiloxane complex. Said suitable reacting temperature means a temperature which is not higher than the boiling point of said suitable solvent, preferably ranging from about 60° C. to about 150° C., and most preferably ranging from 80° C. to 110° C. A refluxing apparatus is preferably adopted when the graft polymerization undergoes at the boiling temperature of said organic solvent.

The polymer backbone of formula (III) can be prepared by any known methods disclosed in the art or purchased directly from the market, namely Petrarch Systems Inc., Bristal, Pa., U.S.A.

The mesogenic monomers of formula (II) can be synthesized according to, but not limited to, the methods disclosed in the following Preparation Examples.

In the following examples, the organic solvents used are preferably in anhydrous form. Anhydrous ethyl ether was prepared by drying over sodium particles and distilling under nitrogen with refluxing, wherein dibenzyl ketone was used as an indicator. Toluene, benzene and ethanol were dried over sodium metal. Anhydrous dichloromethane was prepared by drying over calcium chloride, refluxing under nitrogen for several hours, and then distillation. The organic solvents were dehydrated immediately before use or the dehydrated organic solvents were sealed in containers which were then stored in a drier.

The following apparatuses were used in the analysis and identification of the characteristics of the intermediates and liquid crystalline polysiloxanes synthesized in the following examples:

1. FT-IR spectrum: Nicolet: 520 FT-IR spectrometer was used; a liquid specimen was contained between two KBr tablets and measured; and the unit is $cm^{-1}$.
2. NMR spectrum: Bruker AM 400 MHz NMR was used. d-Chloroform was used as solvent; the chemical shift unit is ppm; the unit of coupling constant is Hz; and $\delta$=0.00 ppm of tetramethylsilane was used as an internal standard. s represents singlet; d represents doublet; t represents triplet; q represents quarlet; and m represent multiplet.
3. Differential Scanning Calorimeter (DSC): Dupont, type 910 DSC equipped with a mechanical cooling accessory and type 2100 Computer/Thermal Analyzer were used. The temperature calibration was carried out by using 5–10 mg in both heating and cooling curves. The heating and cooling rates were 10° C./min. The phase transition temperatures and the thermodynamic function values ($\Delta H$ and $\Delta S$)of the specimens were collected by taking the maximum or minimum values. The glass transition temperatures (Tg's) of polymer specimens were taken at the point of maximum inflection.
4. Optical Polarizing Microscope: Nikon, Microphot-FX optical microscope (40X–800X) was used. Heating and cooling rates were controlled at 10° C./min by using a Mettler FP82 hot stage and a FP 80 central processor.
5. Digital Polarimeter: JASCO MODEL DIP-140 polarimeter equipped with a sodium lamp was used. The length of the specimen groove is 100 cm; 1% dextrose having $[\alpha]_D$=+52.5~+53 was used as a calibration standard; and all the specimens were tested at room temperature.
6. Medium Pressure Liquid Chromatography: BUCHI 681 Chromatography pump, Merck Lichro-prop Si 60 310 mm×25 mm (40–63 μm) Chromatography column and BUCHI 3684 fraction collector were used. This apparatus was used when a purification of a monomer specimen by column chromatography was required.
7. Rotary Vacuum Evaporator: EYELA, type N-1 reduced pressure concentrator was used.

The present invention will be further understood from the following Preparation Examples 0–30 and Examples 1–12, which are used to illustrate and not to limit the scope of the present invention.

PREPARATION EXAMPLE 0

Synthesis of 10-Undecen-1-yl tosylate (I-0)

Nitrogen was introduced into a three necks flask containing 50 ml anhydrous pyridine which was stirred at 10° C. 17 g (0.1 mole) 10-undecen-1-ol was added to the stirred pyridine, and then p-tolysufonyl chloride was added slowly such that the temperature of the stirred mixture was not high than 20° C. The stirring was maintained for 10 hours at room temperature, 250 ml ice water was added to the stirred mixture and then extracted with ethyl ether. The ethyl ether layer was collected, washed with 50% HCl aqueous solution, dried over anhydrous $MgSO_4$, filtered and then concentrated to yield 26.81 g colorless liquid. Yield: 79.6%.

$^1$H-NMR (CDCl$_3$, $\delta$): I-0 1.11–1.65(m,14H, —(CH$_2$)$_7$—, 2.04–2.10 (q,2H,—CH$_2$ —CH=),2.49(s,3H, -ph—CH$_3$), 4.05–4.10 (t,2H, —O—CH$_2$— CH$_2$—), 4.93–5.05(m,2H,—CH=CH$_2$), 5.78–5.88(m,1H, —CH=CH$_2$), 7.49–7.36(q, 4H,ArH)

PREPARATION EXAMPLES 1–2

Synthesis of:
(2S)-2-chloro-4-methyl pentanoic acid (I-1);
(2S,3S)-2-chloro-3-methyl pentanoic acid (I-2).

78.7 g (0.6 mole) 2-amino-4-methyl pentanoic acid (preparation example 1) or 0.6 mole 2-amino-3-methyl pentanoic acid (preparation example 2) was dissolved in 700 ml 6N HCl. Total 91 g (1.3 mole) sodium nitrite powder was divided into several portions and were added To the solution in a span of 2 hours while an ice bath was used. The reaction was carried out for 5–6 hours at 0°–5° C., the reaction mixture was extracted with ethyl ether for three times, washed with saturated NaCl aqueous solution, dried over $MgSO_4$, concentrated, and distilled under reduced pressure twice to yield a transparent liquid product. Yield: I-1: 74.7%; I-2: 69.5%. mp: I-1:92° C./3 mmHg; I-2:88° C./3 mmHg. The optical rotation $[\alpha]^{25}_D$ (chloroform): I-1:-I3.98 (neat liquid); I-2: –4.78 (neat liquid).

$^1$H-NMR (CDCl$_3$, $\delta$) I-1 0.85–1.2 (q, 6H, —CH$_3$), 1.75–1.90(m,3H,—CH—, —CH$_2$—), 4.28–4.38 (t,1H, —CH—COO), 8.8 (b,1H,COOH) I-2 0.86–1.04(m,6H,—CH$_3$),1.75–1.90(m,3H,—CH—CH$_2$—), 4.32–4.41(d,1H,—CH—COOH), 10.32(b,1H,COOH)

PREPARATION EXAMPLES 3–4

Synthesis of
(2S)-2-chloro-4-methyl pentanol (I-3);
(2S,3S)-2-chloro-3-methyl pentanol (I-4)

To a solution of 9.05 g (238.5 mmole) LiAlH$_4$ in 250 ml anhydrous ethyl ether 36.42 g (238.5 mmole) compound I-1 (preparation example 3) or 238.5 mmole compound I-2 (preparation example 4) was added dropwise while an ice bath was used. The ice bath was removed when the addition was completed, and the reaction was carried out at room temperature for five hours, an excess amount of ethyl acetate was added to the reaction mixture to react with the residual LiAlH$_4$, and then 60 ml 10% HCl aqueous solution was introduced until no bubbles was generated in the mixture. The resulting reaction mixture was filtered, extracted, dried over MgSO$_4$, concentrated and distilled under reduced pressure to yield a transparent liquid product. Yield: I-3: 46%; I-4: 40%. mp: I-3:48° C./3 mmHg; I-4: 36° C./1 mmHg. The optical rotation $[\alpha]^{25}_D$ (chloroform): I-3: +3.16 (neat liquid); I-4: –7.6 (neat liquid).

$^1$H-NMR(CDCl$_3$,$\delta$) I-3 0.88–0.98(q,6H,—CH$_3$), 1.45–1.75(AB-m,2H,—CH—CH$_2$—), 2.13(s,1H,HO—), 3.61–3.84(AB-m,2H,—O—CH$_2$—), 4.07–4.14(m,1H,Cl—CH—) I-4 0.9–1.0(t,3H,—CH$_2$—CH$_3$), 1.1(d,3H,—CH—CH$_3$), 1.3– 1.7(AB-m,2H,CH$_3$—CH—CH$_2$—), 1.9–2.0(m, 1H,—CH—), 3.6–3.8 (AB-m, 2H, O—CH$_2$—), 4.07–4.14 (m,1H,Cl—CH—)

PREPARATION EXAMPLES 5–6

Synthesis of
(2S)-2-chloro-4-methylpentyl 4-hydroxybenzoate (I-5);
(2S,3S)-2-chloro-3-methylpentyl 4-hydroxybenzoate (I-6)

In a 30 ml flask equipped with a Dean-Stark trap 20 ml anhydrous benzene, 9.66 (70 mmole) 4-hydroxybenzoic acid, 20.5 g (150 mmole) compound 3 (preparation example 5) or 150 mmole compound 4 (preparation example 6) and 4 drops of sulfuric acid were charged in sequence and refluxed until 1 ml water was collected in the Dean-Stark trap. The esterification reaction mixture was cooled to room temperature, filtered, extracted with 150 ml ethyl ether. The ethyl ether layer was collected, washed with 10 ml 2% (w/w) sodium hydrogen carbonate aqueous solution twice, washed with saturated NaCl aqueous solution, dried over $MgSO_4$, concentrated, distilled to remove the residual compound I-3 or I-4, and purified with silica gel 70–230 mesh column chromatography (500 ml of ethyl acetate/n-hexane =¼ mixture was used as eluent) to obtain product. Yield: I-5: 86%; I-6:-90%. The optical rotation $[\alpha]^{25}_D$ (chloroform): I-5: −3.12 (c=1.6); I-6: +2.03 (c=2.7).

$^1$H-NMR ($CDCl_3$, δ) I-5 0.9–1.0(q,6H,-$CH_3$), 1.56–1.90(AB-m,2H,—$CH_2$—CO), 4.38–4.51(AB-q,2H, COO—$CH_2$—), 6.65(s,1H,ArOH), 6.9–8.0 (AB-d, 4H, ArH) I-6 0.9–1.0 (t,3H,—$CH_2$—$CH_3$) , 1.1 ( d,3H,—CH—$CH_3$), 1.3– 1.7(AB,m,2H,$CH_3$—CH—$CH_2$—), 1.9–2.0(m, 1H,$CH_3$—CH—), 4.2(m,1H,Cl—CH—), 4.45–4.64(q,2H, COO—$CH_2$—), 6.8 (s,1H,ArOH), 6.9–8.0 (AB-d,4H, ArH)

PREPARATION EXAMPLES 7–9

Synthesis of
6-Allyloxy naphthyl-2-carboxylic acid (I-7);
6-(5-Hexene-1-yloxy)naphthyl-2-carboxylic acid (I-8);
6-(10-Undecen-1-yloxy)naphthyl-2-carboxylic acid (I-9).

Compounds I-7 to I-9 were synthesized by the same method. The synthesis of compound I-7 was described below as an example. 1.5 g (8 mmole) 6-hydroxyl-2-benzoic acid and 500 ml ethanol were charged to a flask, 50 ml water and 1.07 g (19 mmole) KOH were then added and the mixture was refluxed for one hour. 3.89 g compound I-0 was introduced into the flask dropwise, the mixture was refluxed for two hours, cooled to room temperature and diluted with water and dilute HCl aqueous solution. White precipitate was obtained by filtration and then recrystallized from an acetic acid aqueous solution to yield 2.32 g of white solid. Yield: I-7: 89%; I-8: 81%; I-9: 85.5%. mp: I-7: 150° C.; I-8: 125° C.; I-9: 118° C.

$^1$H-NMR ($CDCl_3$, δ) I-7 4.6(d,2H,=CH—$CH_2$—O), 5.32–5.53(m,2H,$CH_2$=), 6.09–6.20(m,1H,=CH—), 7.2–8.7(m,6H,ArH) I-8 1.56–1.70(m,2H,—$CH_2$—), 1.86–2.00(m,2H,—$CH_2$—), 2.14–2.28(m,2H,=CH—$CH_2$—),4.08–4.20(t,2H, —$CH_2$—O),4.98–5.13(mq,2H, =$CH_2$), 5.80–5.95 (m, 1H,=CH—),7.10–8.65(m,6H,ArH) I-9 1.25–1.60(m,12H,—$(CH_2)_6$—),1.72–1.92 (m,2H, —$CH_2$—$CH_2$—O),2.0–2.1(q,2H,=CH—$CH_2$—$CH_2$), 4.12(t,—$CH_2$—O),4.91–5.15(m,4H,=$CH_2$),5.76– 5.90(m, 1H,=CH—), 7.16–8.63(m,6H,ArH)

PREPARATION EXAMPLES 10–15

Synthesis of
(2S)-[4-(2-Chloro-4-methylpentoxycarbonyl)phenyl] 6-allyloxy-2-naphthoate (I-10);
(2S)-[4-(2-Chloro-4-methylpentoxycarbonyl)phenyl]6-(5-hexen-1-yloxy)-2-naphthoate (I-11);
(2S)-[4-(2-Chloro-4-methylpentoxycarbonyl)phenyl] 6-(10-undecen-1-yloxy)-2-naphthoate (I-12);
(2S,3S)-[4-(2-Chloro-3-methylpentoxycarbonyl)phenyl] 6-allyloxy-2naphthoate (I-13);
(2S,3S)-[4-(2-Chloro-3-methylpentoxycarbonyl)phenyl] 6-(5-hexen-1-yloxy)-2-naphthoate (I-14);
(2S,3S)-[4-(2-Chloro-3-methylpentoxycarbonyl) phenyl] 6-(10-undecen-1-yloxy)-2-naphythoate (I-15).

Compounds I-10 to I-15 were synthesized by the same method which comprises converting an carboxylic acid group of compound I-7 (preparation examples 10 and 13), I-8 (preparation examples 11 and t4) or I-9 (preparation examples 12 and 15) to acyl chloride group and reacting with the hydroxyl group of compound I-3 (preparation examples 10–12)or I-4 (preparation examples 13–15). The synthesis of compound I-10 was described below as an example. Part (A): 0.6 g (2.36 mmole) compound I-7, 20 ml dichloromethane, one drop of dimethylformamide and 2 ml thionylchloride were mixed and refluxed. The solvent and excess thionylchloride were removed under reduced pressure to give the corresponding acyl chloride which was then dissolved in 10 ml anhydrous dichloromethane and added to part (B). Part (B): 0.67 g (2.63 mmole) compound I-3, 0.43 ml triethylamine and 20 ml anhydrous dichloromethane were mixed and stirred in an ice water bath for 10 minutes. Part (A) solution was poured into part (B), stirred at room temperature for two hours, and extracted with 20 dichloromethane. The organic layer was collected, washed with saturated NaCl aqueous solution, dried over $MgSO_4$, concentrated, purified with a medium pressure liquid chromatography (a mixture; of ethyl acetate/n-hexane=1/25 was used as eluent), and concentrated to obtain a white solid product. Yield: I-10: 75.3%; I-11: 67%; I-12: 78,6%; I-13: 59.7%; I-14: 74.5%; I-15: 76%. The optical rotation $[\alpha]^{25}_D$ (chloroform): I-10: −5.96 (c=6.52); I-11: −10.02 (c=1.6); I-12: −5.66 (c=1.1); I-13: +10.72 (c=4); I-14:I-15: +9.71 (c=0.7).

$^1$H-NMR ($CDCl_3$, δ) I-10 0.9–1.1(q,6H,—$CH_3$), 1.5–1.8(AB-m,2H,—CHCl—$CH_2$—), 1.9–2.1(m,1H, $CH_2$—CH—),4.2–4.3(m,1H,—CHCl—), 4.4–4.6(AB-q,2H, O—$CH_2$—CClH—), 4.7 (d,2H;=CH— $CH_2$—O),5.3–5.6(m,2H,$CH_2$=),6.1–6.2(m,1H,=CH—), 7.2–7.8 (m,10H,ArH) I-11 0.9–1.1(q,6H,—$CH_3$),1.58–1.80(m,4H, —$CH_2$—,—CClH —$CH_2$—),1.82–2.01(m,3H,=CH—$CH_2$—,—CH—),2.02– 2.22(m,2H,—$CH_2$—$CH_2$—O—), 4.08–4.15(t,2H,—$CH_2$— $CH_2$—O),4.2–4.3(m,1H,—CHCl—) 4.4–4.52(AB-q,2H, O—$CH_2$—CHCl—), 4.95–5.09(m,2H,$CH_2$=CH—),5.78– 5.90(m,1H, $CH_2$=CH—), 7.14–8.68(m,10H,ArH) I-12 0.9–1.1(q,6H, —$CH_3$), 1.25–1.55(m,12H,—$(CH_2)_6$—), 1.6–1.8 (Ag-m, 2H, CHCl—$CH_2$—), 1.85–1.95 (m, 2H,— $CH_2$—$CH_2$—O),1.95–2.02(m,1H,—CH—), 2.03–2.10 (q,2H,=CH—$CH_2$—), 4.1–4.15(t,2H,CH—$CH_2$—O), 4.23– 4.32(m,1H, —CHCl—), 4.42–4.56(AB-m,2H,—O—$CH_2$ —CHCl—), I-13 0.9–1.0 (t,3H,—$CH_2$—$CH_3$),1.05–1.15(d,2H,—CH—$CH_3$), 1.32–1.72(m,2H,—CH—$CH_2$—),1.87–2.05(m,1H, —CH—),4.15–4.25(m,1H,—CHCl—),4.45–4.65(AB-q,2H, —COO—$CH_2$—),4.7(d,2H,=CH—$CH_2$—O), 5.32–5.54(m, 2H,$CH_2$=), 6.08–6.21(m,1H,$CH_1$=CH—), 7.18–8.61 m,10H,ArH) I-14 0.9–1.0(t,3H,—$CH_2$—$CH_3$), 1.05–1.1(d,3H,—CH—$CH_3$), 1.32–1.68 (m,4H,—CH—$CH_2$—$CH_2$—,—CH—CH—$CH_2$), 1.34–1.56(m,3H,—$CH_2$—$CH_2$—O—,—CH—), 2.11–2.20 (q,2H,=CH—$CH_2$—), 4.08–4.12(t,2H,—$CH_2$—O), 4.14– 4.21 (m,1H,—CHCl—),4.44–4.62(AB-q,2H,COO—$CH_2$—), 4.96–5.09(m,2H,$CH_2$=),5.8–5.9(m,1H,=CH—),7.15– 8.69 (m,10H,ArH)
I-15 0.9–1.0(t,3m,—$CH_2$—$CH_3$),1.05–1.15(d,3H,—CH—$CH_3$), 1.24–1.71(m,14H,—CH—$CH_2$—$CH_3$,—$(CH_2)_6$), 1.83– 2.0(m,3H,—$CH_2$—$CH_2$—O,—CH—),2.02–2.1(q, 2H,=CH— $CH_2$—),4.09–4.15(t,2H,—$CH_2$—O), 4.18–4.23(m,1H, CHCl—).4.46–4.64(q,2H,COO—$CH_2$—),4.92–5.06(q, 2H,$CH_2$=),5.77–5.90(m,1H, =CH—),7.20–8.72(m, 10H,ArH)

Examples 1–6

Synthesis of
Poly[methyl[(2S)-[4-(2-chloro-4-methylpentoxy-carbonyl)phenyl] 6-allyloxy-2-naphthoate]siloxane](P-1);
Poly[methyl[(2S )-[4(2-chloro- 4-methylpentoxy-carbonyl)phenyl]6-(5-hexen- 1-yloxy)-2-naphthoate]siloxane] (P-2);
Poly[methyl[(2S)-[4-(2-chloro- 4-methylpentoxy-carbonyl)phenyl]6-(10-undecen- 1-yloxy)-2-naphthoate]siloxane](P-3);
Poly[methyl[(2S,3S)-[4-(2-chloro- 3-methylpentoxy-carbonyl )phenyl]6-allyloxy-2-naphthoate]siloxane](P-4);
Poly[methyl[(2S,3S)-[4-(2-chloro- 3-methylpentoxy-carbonyl)phenyl]6-(5-hexen- 1-yloxy)-2-naphthoate]siloxane] (P-5);
Poly[methyl[(2S,3S)-[4-(2-chloro- 3-methylpentoxy-carbonyl)phenyl]6-(10-undecen- 1-yloxy)-2-naphthoate]siloxane](P-6)

Polymethylhydrogensiloxane (Code PS120) having a number average molecular weight of 2270 and platinum-divinyltetramethyldisiloxane complex catalyst were obtained from Petrarch Systems Inc., Bristal, Pa., U.S.A. and used as received. 1.1 equivalent moles of compound I-10 (example 1), I-11 (example 2), I-12 (example 3), I-13 (example 4), I-14 (example 5) or I-15 (example 6) was dissolved in an suitable amount of toluene together with polymethylhydrogensiloxane. The reaction was carried cut at about 80° C. in the presence of platinum divinyltetramethyldisiloxane complex catalyst. FT-IR analysis was run to detect the absorption peak of Si-H bond (2180 $cm^{-1}$) of the reaction mixture. The hydrosilation reaction was complete when the Si-H absorption peak disappeared. The reaction mixture was concentrated and the reaction product was purified by several reprecipitations from methanol.

Table 1 shows the m and n values of the synthesized polymers P-1 to P-6 in the above formula (I).

TABLE 1

| Example | Monomer | Polymer | m | n |
|---|---|---|---|---|
| 1 | I-10 | P-1 | 40 | 1 |
| 2 | I-11 | P-2 | 40 | 4 |
| 3 | I-12 | P-3 | 40 | 9 |
| 4 | I-13 | P-4 | 40 | 1 |
| 5 | I-14 | P-5 | 40 | 4 |
| 6 | I-15 | P-6 | 40 | 9 |

The monomers I-10 to I-15 and polymers P-1 to P-6 were characterized by differential scanning calorimetry and optical polarizing microscopy.

Figure 2:
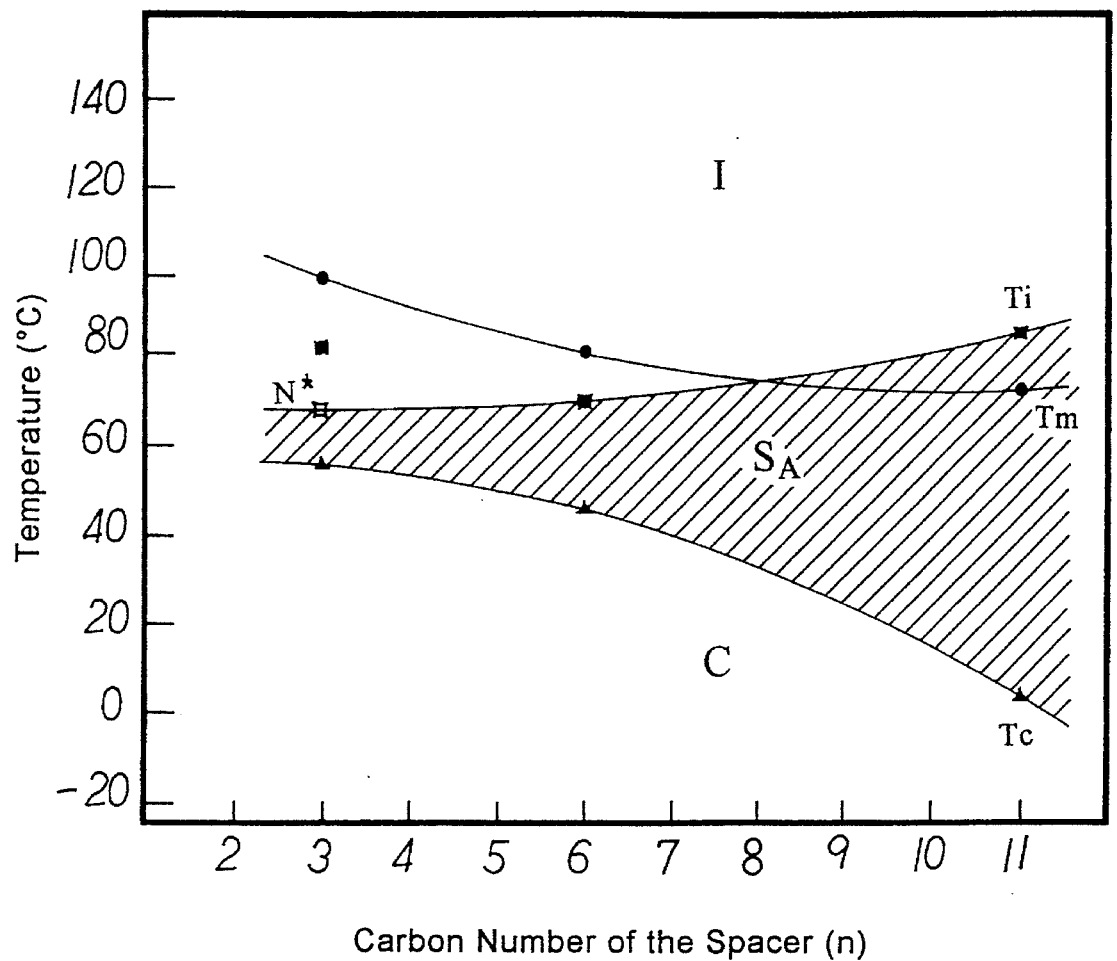
FIG. 2 is a plot which show phase transition behavior of monomers I-13 to I-15 as a function of the length of spacer, wherein ● represents the melting point, Tm; ■ represents the isotropic phase temperature, Ti; ▲ represents the crystallization temperature, Tc; and ☐ represent the cholesteric phase temperature, N*.
Figure 3:
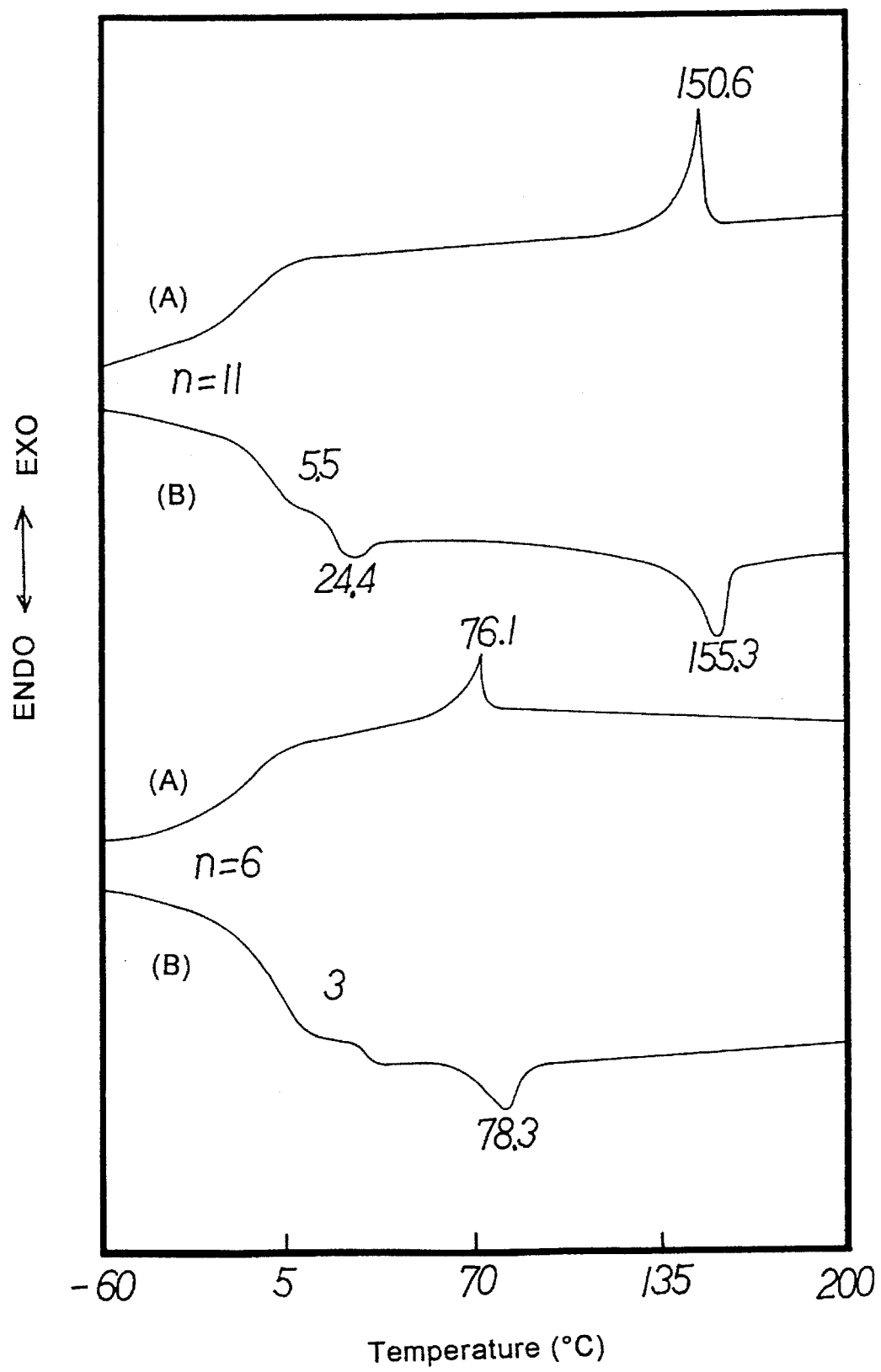
FIG. 3 are normalized Differential Scanning Calorimeter (DSC) thermograms (10° C./min) for polymers P-2 to P-3: A) heating scan; B) cooling scan.
Figure 4:
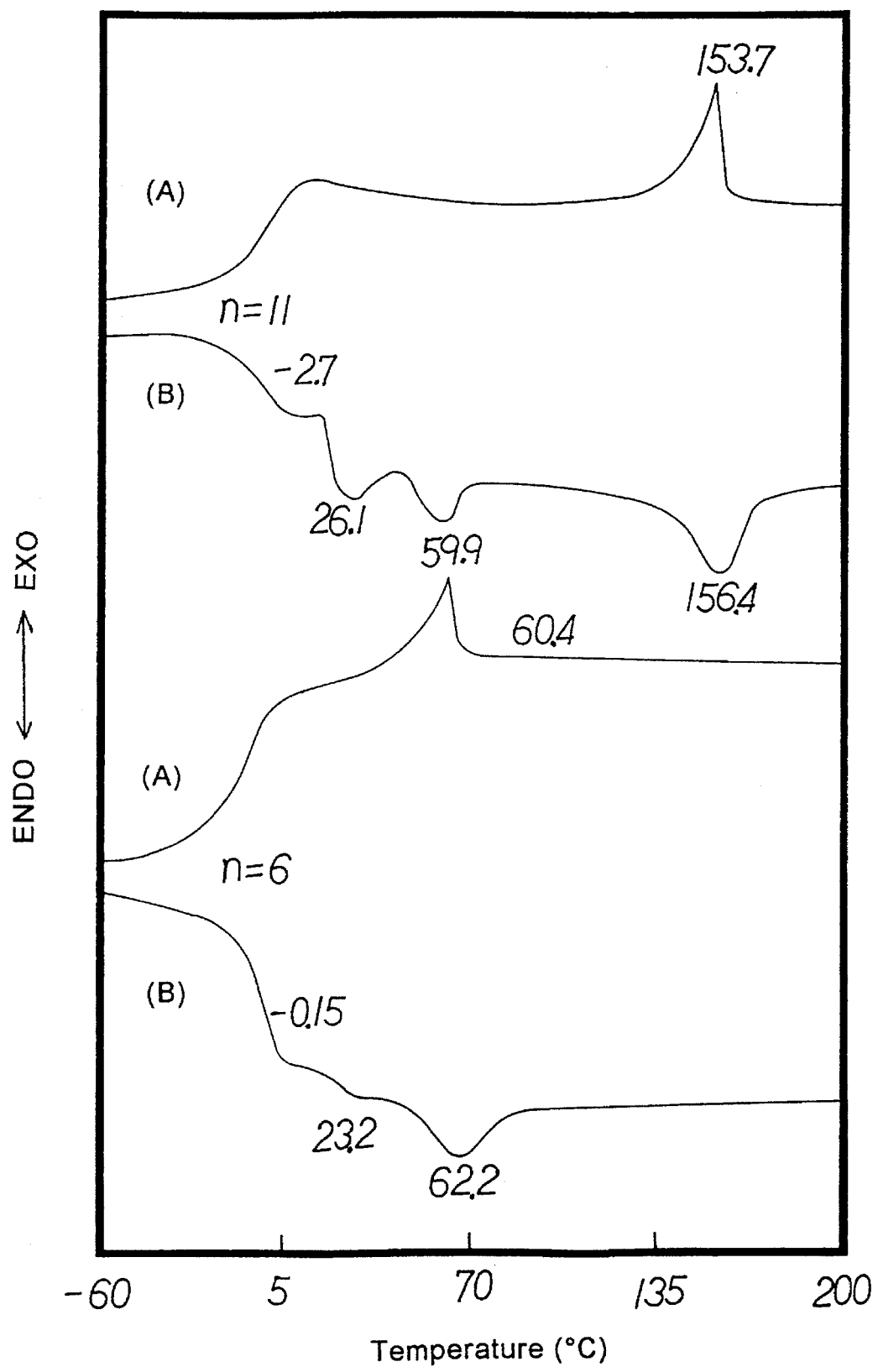
FIG. 4 are normalized Differential Scanning Calorimeter (DSC) thermograms (10° C./min) for polymers P-5 to P-6: A) heating scan; B) cooling scan.
Figure 5:
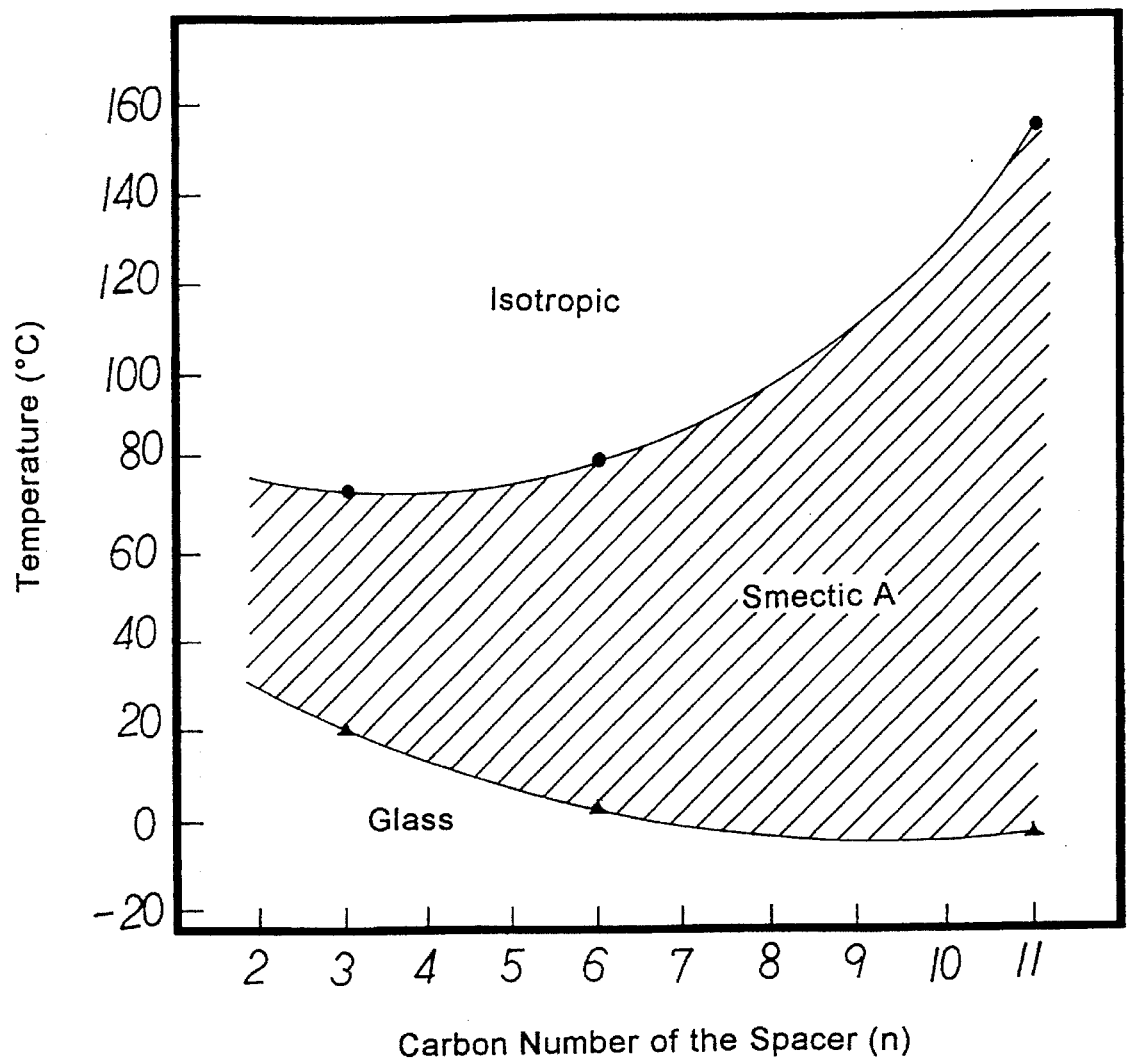
FIG. 5 is a plot which show phase transition behavior of polymers P-1 to P-3 as a function of the length of spacer, wherein ● represents the isotropic phase temperature; and ▲ represents the glass transition temperature.
Figure 12:
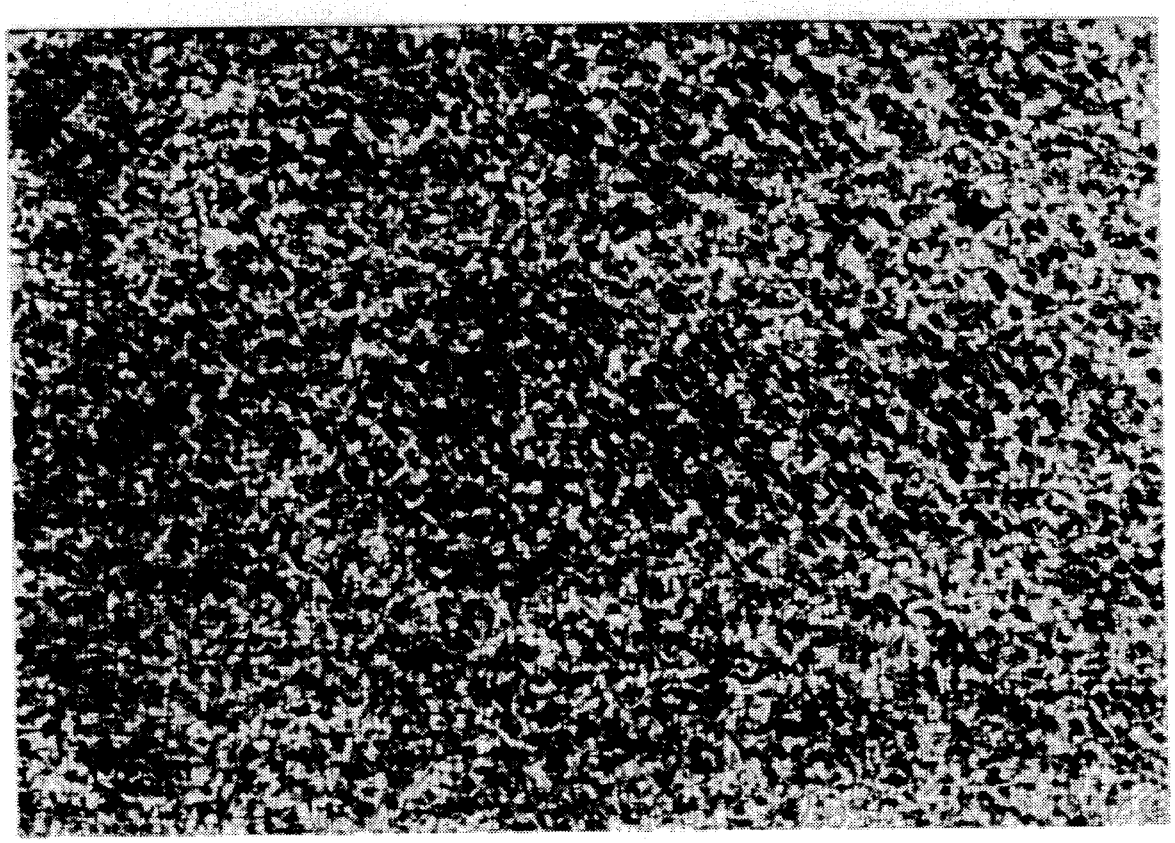
FIG. 12 is an optical polarizing micrograph (magnification 640X) of monomer I-10: smectic A texture obtained at 46.8° C.
Figure 13:
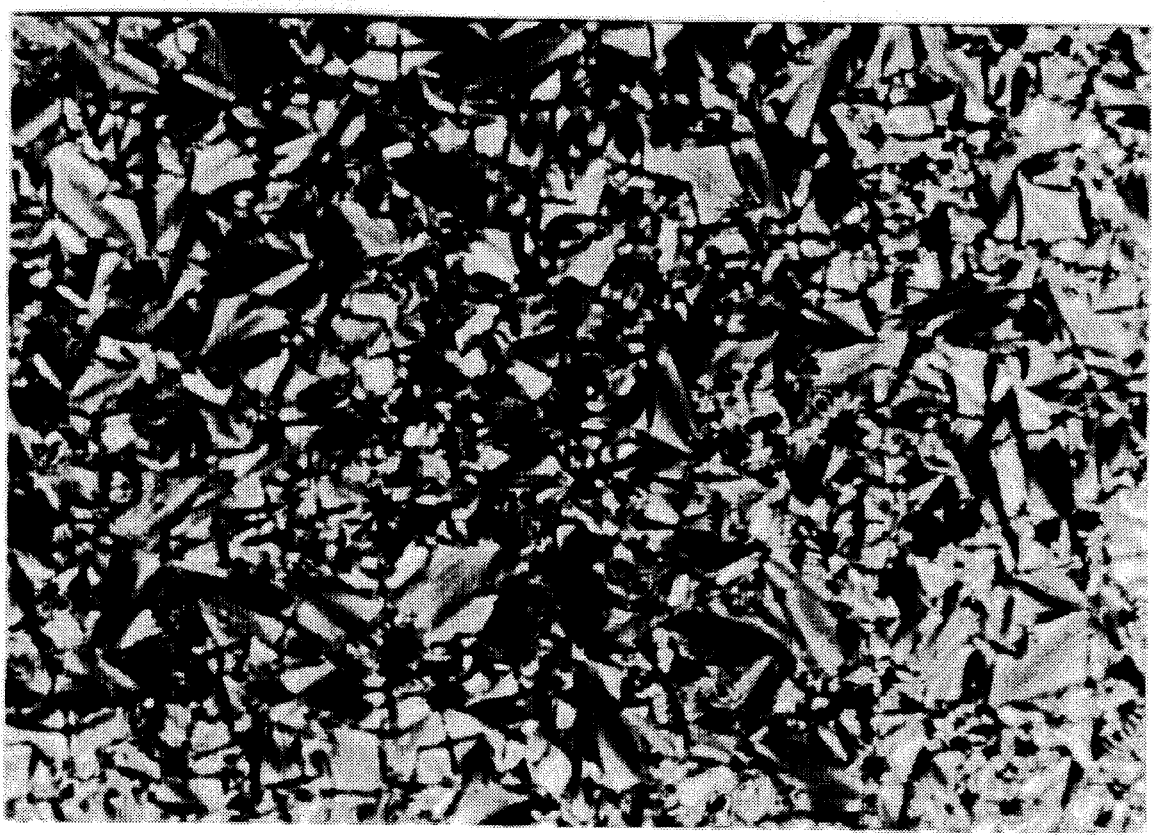
FIG. 13 is an optical polarizing micrograph (magnification 640X) of monomer I-11: smectic A texture obtained at 62.8° C.
Figure 14:
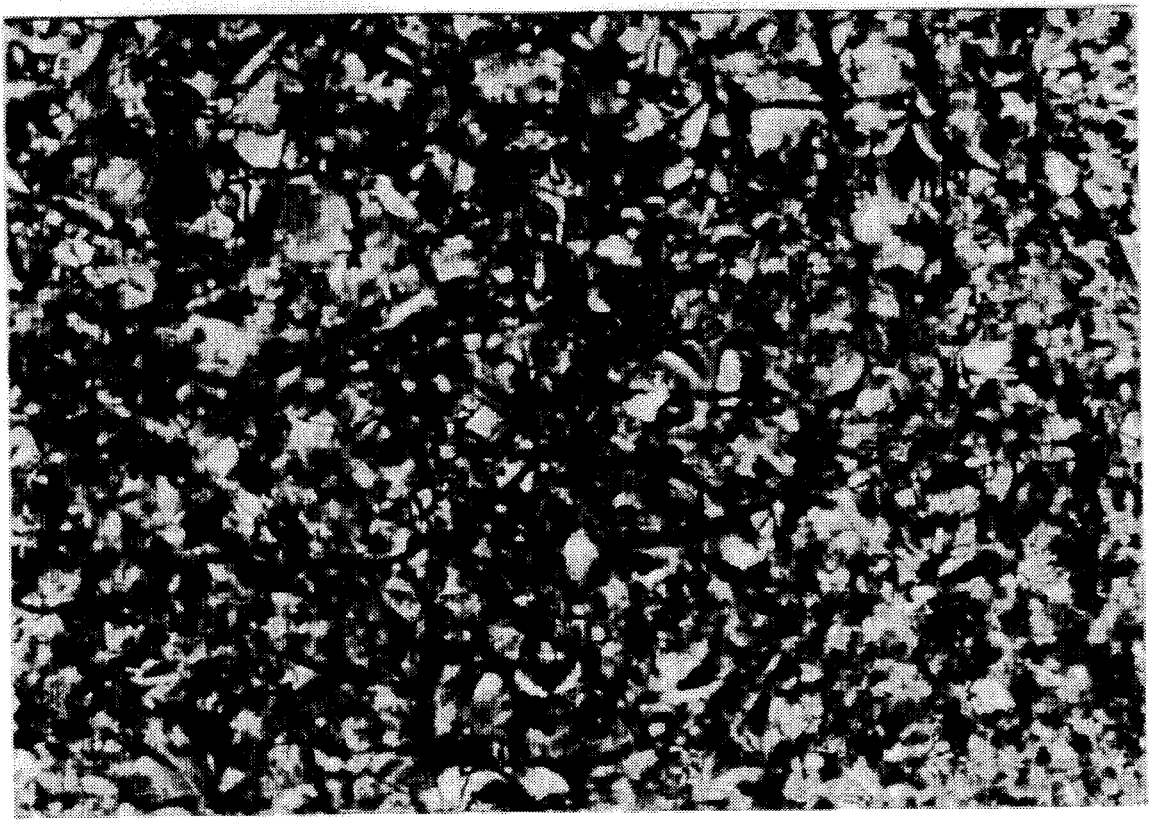
FIG. 14 is an optical polarizing micrograph (magnification 640X) of monomer I-11: smectic A texture obtained at 64.7%.
Figure 15:
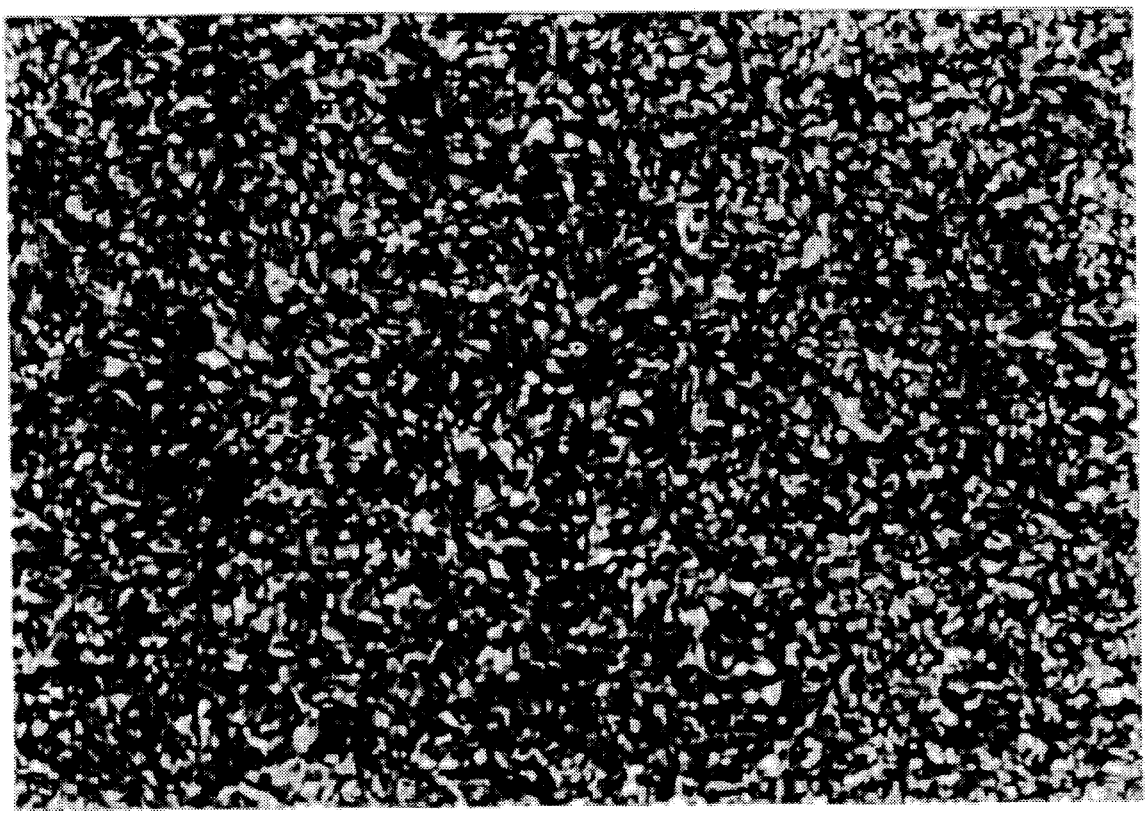
FIG. 15 is an optical polarizing micrograph of polymer P-3: smectic texture obtained at 157.5%.
Figure 16:
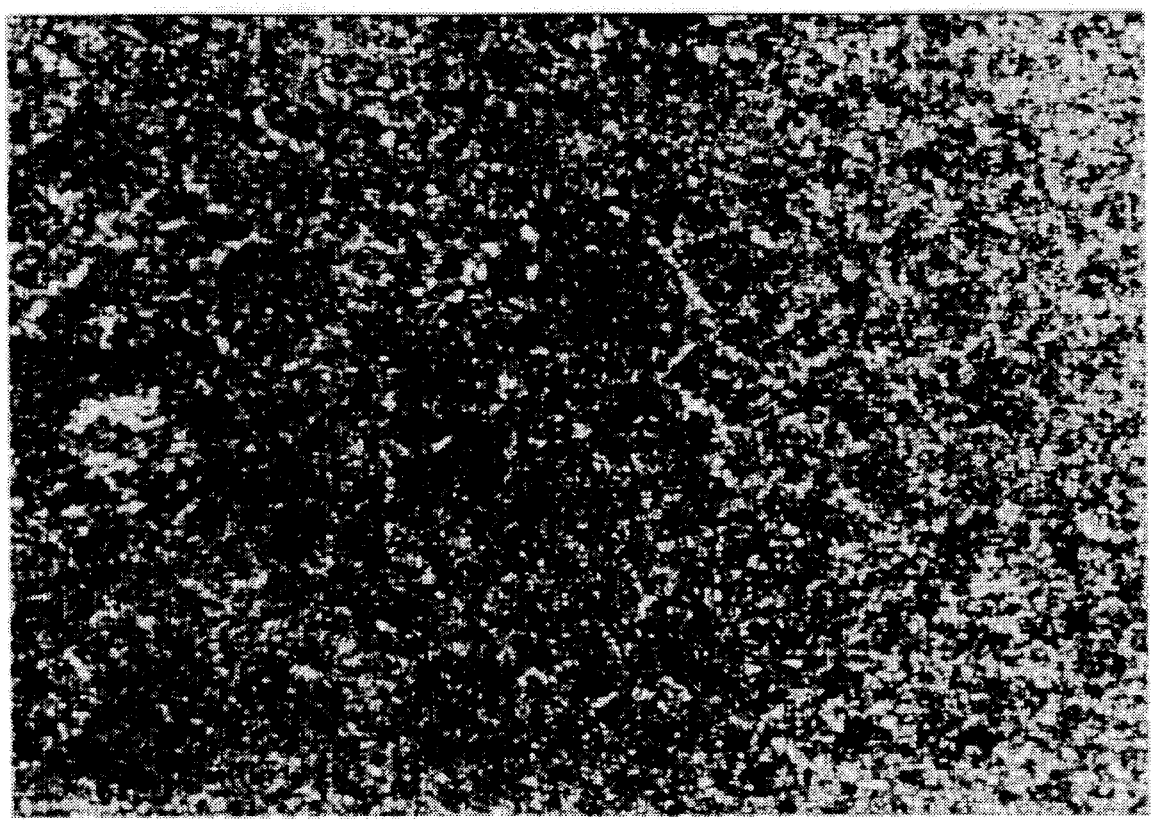
FIG. 16 is an optical polarizing micrograph of monomer I-13: cholesteric texture obtained at 76.7° C.
Figure 17:
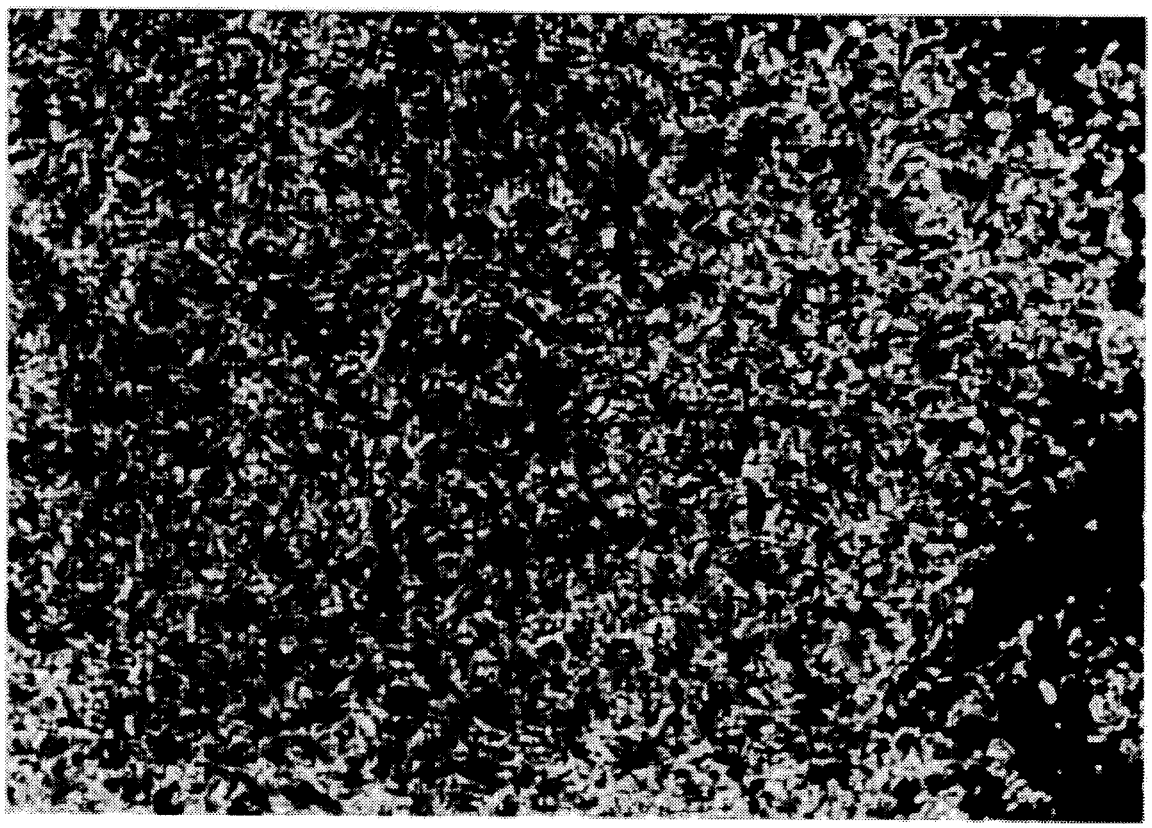
FIG. 17 is an optical polarizing micrograph of monomer I-13: smectic A texture obtained at 67.3%.
Figure 18:
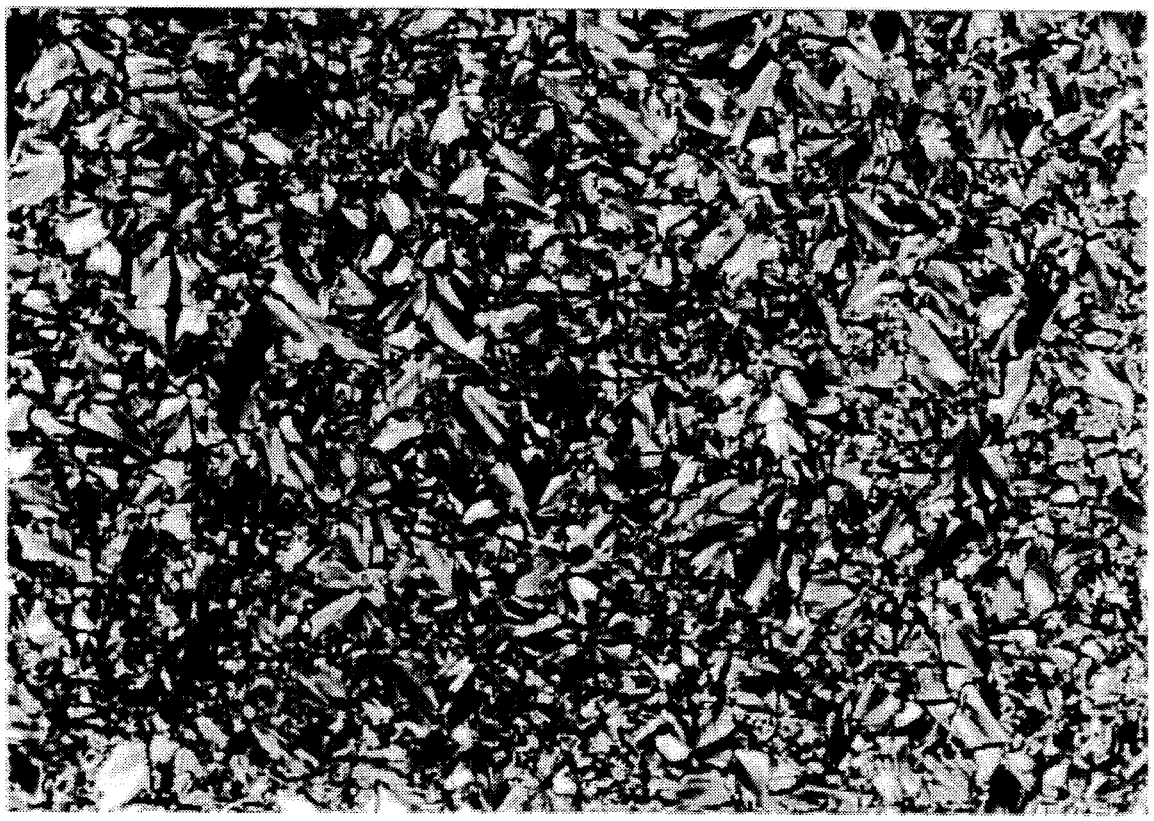
FIG. 18 is an optical polarizing micrograph of polymer P-5: smectic A texture obtained at 25%.
Figure 19:
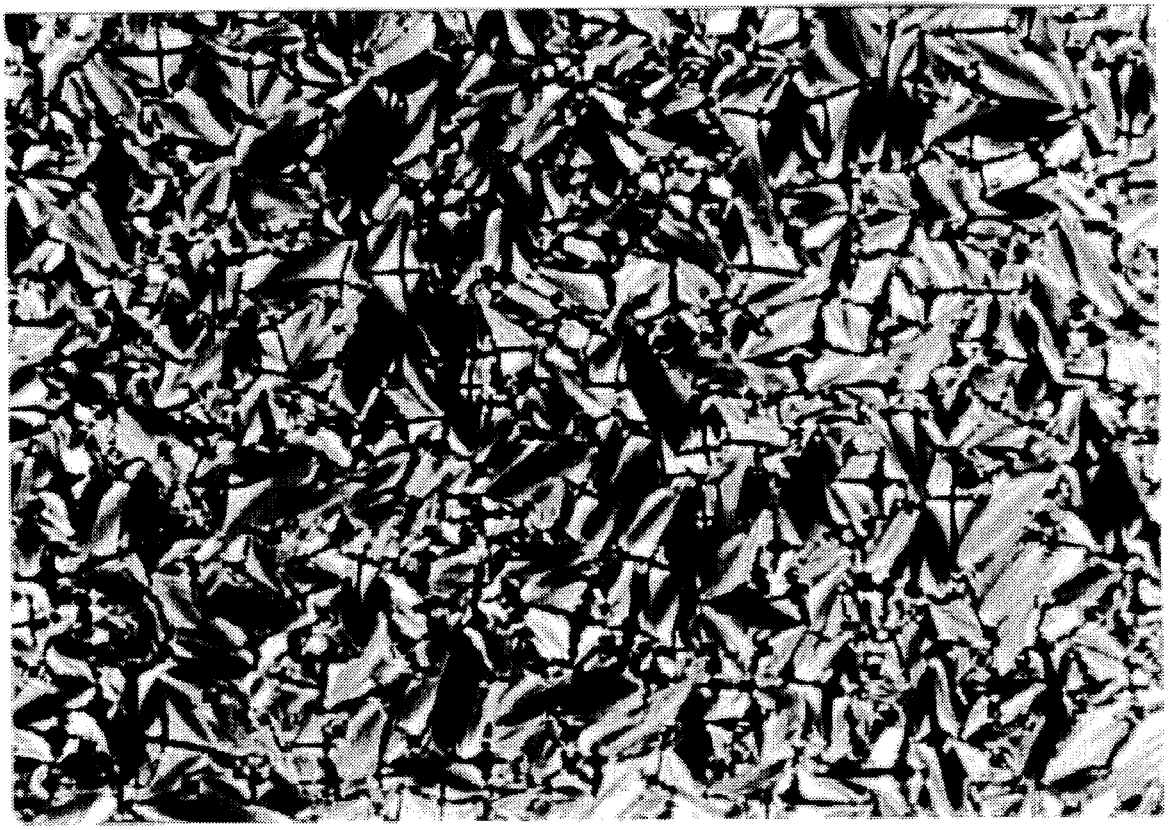
FIG. 19 is an optical polarizing micrograph of polymer P-6: smectic A texture obtained at 25%.

Tables 2 and 3 present the thermal transitions and thermodynamic parameters of the synthesized monomers I-10 to I-12 and I-13 to I-15 respectively. It can be seen from the DSC heating and cooling traces and ΔH values that monomers I-10 to I-12 and I-13 to I-15 have substantially the same phase transitions. The optical polarizing micrographs of monomers I-10 (FIG. 12) and I-13 (FIGS. 16–17) display both the cholesteric texture and smectic A texture. The optical polarizing micrographs of monomers I-11 (FIGS. 13–14), I-12, I-14 and I-15 display only the smectic A texture. FIG. 1 shows that the phase transition behavior of monomers I-10 to I-12 as a function of the number (n) of carbon atom of the spacer. FIG. 2 shows that the phase transition behavior of monomers I-13 to I-15 as a function of the number (n) of carbon atom of the spacer. It can be seen from FIGS. 1 and 2 that the melting point of monomers I-10 to I-15 decreases as the carbon atom number of the spacer thereof increases, and the temperature range in which monomers I-10 to I-15 exhibit smectic A phase increases as the carbon atom number of the, spacer thereof increase. This phenomenon is more significant in FIG. 2 than in FIG. 1. Tables 4 and 5 present the thermal transitions and thermodynamic parameters of the synthesized polymers P-1 to P-3 and P-4 to P-6 respectively. The polymers P-1 to P-3 are different from the polymers P-4 to P-6 only in the substituent position on the mesogenic group, and the DSC thermograms of P-2 and P-3 presented in FIGS. 3 and the DSC thermograms of P-5 and P-6 presented 5 in FIG. 4 show that P-2 and P-3 have substantially the same phase transitions as P-5 and P-6 respectively. The optical polarizing microscopy shows that all the polymers P-1 to P-6 exhibit smectic A phase (FIGS. 15, 18–19). FIG. 5 shows that the phase transition behavior of polymers P-1 to P-3 as a function of the number (n) of carbon atom of the spacer. It can be seen from FIG. 5 that the glass transition temperature decreases, isotropic transition temperature increases and the temperature range in which the polymer exhibits smectic A phase becomes wider, when the carbon atom number of the spacer of polymers P-1 to P-3 increases. It can be also seen from Table 4 that ΔH value increases as the carbon atom number of the spacer of polymers P-1 to P-3 increases. It is believed that these phenomena are caused by a longer flexible spacer which in turn enhances a more regular arrangement of the side chains.

TABLE 2

Phase transitions and phase transition enthalpies for monomers I-10 to I-12

| | | Phase transitions, °C.(corresponding enthalpy changes, Kcal/mol) (A) Heating scan | | |
|---|---|---|---|---|
| Monomer | n | Tm(ΔHm) | T(ΔH) | Ti(ΔHi) |
| I-10 | 1 | K 78.7(23.17) | —(—) | —(—)I |
| I-11 | 4 | K 67.5(30.23) | —(—) | —(—)I |
| I-12 | 9 | K 80.3(55.25) | —(—) | —(—)I |

| | | (B) Cooling scan | | |
|---|---|---|---|---|
| Monomer | n | Tm(ΔHm) | T(ΔH) | Ti(ΔHi) |
| I-10 | 1 | I 63.0(0.27)N* | 52.5(0.36) | $S_A$ 16.5(12.39)C |
| I-11 | 4 | I 65.1(3.67) | —(—) | $S_A$ 19.3(17.60)C |
| I-12 | 9 | I 77.7(5.32) | —(—) | $S_A$ 13.2(24.12)C |

K = crystallization, S = smectic, I = isotropic, N* = cholesteric.
(A) = second heating, (B) first cooling.

TABLE 3

Phase transitions and phase transition enthalpies for monomers I-13 to I-15

| | | Phase transitions, °C.(corresponding enthalpy changes, Kcal/mol) (A) Heating scan | | |
|---|---|---|---|---|
| Monomer | n | Tm(ΔHm) | T(ΔH) | Ti(ΔHi) |
| I-13 | 1 | K 99.4(27.60) | —(—) | —(—)I |
| I-14 | 4 | K 81.9(13.48) | —(—) | —(—)I |
| I-15 | 9 | K 71.4(36.73) | —(—) | $S_A$ 86.5(4.40)I |

| | | (B) Cooling scan | | |
|---|---|---|---|---|
| Monomer | n | Tm(ΔHm) | T(ΔH) | Ti(ΔHi) |
| I-13 | 1 | I 83.1(0.23)N* | 68.66(0.91) | $S_A$ 55.7(20.54)C |
| I-14 | 4 | I 70.9(1.29) | —(—) | $S_A$ 45.8(8.06)C |
| I-15 | 9 | I 84.7(4.92) | —(—) | $S_A$ 3.7(15.39)C |

K = crystallization, S = smectic, I = isotropic, N* = cholesteric.
(A) = second heating, (B) first cooling.

TABLE 4

Phase transitions and phase transition enthalpies for polymers P-1 to P-3

| | | | Phase transitions, °C.(corresponding enthalpy changes, Kcal/mru) (A) Heating scan | | |
|---|---|---|---|---|---|
| Polymer | n | Tg | Tm(ΔHm) | $T_1(\Delta H_1)$ | Ti(ΔHi) |
| P-1 | 1 | 20.4 | —(—) | —(—) $S_A$ | 72(0.07)I |
| P-2 | 4 | 3.0 | —(—) | —(—) $S_A$ | 78.5(0.73)I |
| P-3 | 9 | -2.5 | —(—) | —(—) $S_A$ | 155.3(0.91)I |

| | | (B) Cooling scan | | |
|---|---|---|---|---|
| Polymer | n | Ti(ΔHi) | $T_1(\Delta H_1)$ | Tc(ΔHc) |
| P-1 | 1 | I 69.1(0.10) $S_A$ | —(—) | —(—)C |
| P-2 | 4 | I 76.1(0.51) $S_A$ | —(—) | —(—)C |
| P-3 | 9 | I 150.5(0.94) $S_A$ | —(—) | —(—)C | mru = mole of repeating units, Tg = glass transition temperature, K = crystallization, S = smectic, I = isotropic, N* = cholesteric.
(A) = second heating, (B) first cooling.

TABLE 5

Phase transitions and phase transition enthalpies for polymers P-4 to P-6

| | | | Phase transitions, °C.(corresponding enthalpy changes, Kcal/mol) (A) Heating scan | | |
|---|---|---|---|---|---|
| Polymer | n | Tg | Tm(ΔHm) | $T_1(\Delta H_1)$ | Ti(ΔHi) |
| P-4 | 1 | 26.0 | —(—) | —(—) $S_A$ | 87.2(0.94)I |
| P-5 | 4 | -0.15 | —(—) | —(—) $S_A$ | 62.2(0.48)I |
| P-6 | 9 | -2.7 | —(—) | —(—) $S_A$ | 156.4(0.81)I |

| | | (B) Cooling scan | | |
|---|---|---|---|---|
| Polymer | n | Ti(ΔHi) | $T_1(\Delta H_1)$ | Tc(ΔHc) |
| P-4 | 1 | I 59.8(0.32) $S_A$ | —(—) | —(—)C |
| P-5 | 4 | I 62.4(0.46) $S_A$ | —(—) | —(—)C |
| P-6 | 9 | I 155.7(0.86) $S_A$ | —(—) | —(—)C | mru = mole of repeating units, Tg = glass transition temperature, K = crystallization, S = smectic, I = isotropic, N* = cholesteric.
(A) = second heating, (B) first cooling.

PREPARATION EXAMPLE 16

Synthesis of 6-Bromo-1-hexene (I-16)

Compound I-16 was prepared by removing HBr from 1,6-dibromohexane. 100 ml 1,6-dibromohexane was charged to an 250 ml two-neck flask, wherein one neck thereof was equipped with an feeding funnel of 50 ml hexamethyl phosphorous triamide and the other neck thereof was equipped with a distillation apparatus having an acetone/Dry Ice cold trap. The 1,6-dibromohexane was heated to 195° C. and then hexamethyl phosphorous triamide was added with a rate of one drop per second. The reaction product was collected in the cold trap during the addition due to its low boiling point. The temperature was raised to 220° C. as soon as the addition of hexamethyl phosphorous triamide was completed. The product collected in the cold trap was further subjected to distillation twice to yield colorless liquid. Yield: 50.3%. mp: 22°–24° C./1 mmHg.

$^1$H-NMR(CDCl$_3$,TMS,δppm):1.5–2.0(m,6H,—(CH$_2$)$_3$—CH$_2$—Br), 3.35 (t,2H,—CH$_2$—Br),5.0(m,2H,—CH=CH$_2$),5.7(m,1H, —CH=CH$_2$).

PREPARATION EXAMPLE 17

Synthesis of 10-Undecen-1-yl tosylate (I-17)

Nitrogen was introduced into a three-neck flask containing 50 ml anhydrous pyridine which was stirred at 10° C. 17 g (0.1 mole) 10-undecen-1-ol was added to the stirred pyridine, and then p-tolysufonyl chloride was added slowly such that the temperature of the stirred mixture was not high than 20° C. The stirring was maintained for 10 hours at room temperature, 250 ml ice water was added to the stirred mixture and then extracted with ethyl ether. The ethyl ether layer was collected, washed with 50% HCl aqueous solution, dried over anhydrous MgSO$_4$, filtered and then concentrated to yield 26.81 g colorless liquid. Yield: 79.6%.

$^1$H-NMR (CDCl$_3$,TMS,δppm): 1.20–1.60(m,14N,—(CH$_2$)$_7$—CH$_2$O—),1.95(m,2H,=CH —CH$_3$—),2.40(s,3H, —CH$_3$),3.50(t,2H,—OCH$_2$—), 4.8 (m,2H,—CH=CH$_2$), 5.00 (m,1H,—CH=CH,), 7.20–7.70 (m,4H,aromatic protons).

PREPARATION EXAMPLES 18–20

Synthesis of
4-Allyloxybenzoic acid (I-18);
4-(5-Hexen-1-yloxy)benzoic acid (I-19);
4-(10-Undecen-1-yloxy)benzoic acid (I-20).

All the three compounds were prepared by the same method. The compounds I-18, I-19 and I-12 were synthesized by separately reacting 3-allyl bromide, compounds I-16 and I-17 with 4-hydroxyl benzoic acid. The synthesis of compound I-19 was described below as an example. 6.0 g 4-hydroxyl benzoic acid, 150 ml ethanol (90%), KI and NaOH were heated to reflux for one hour. An excess amount of compound 1–16 (1.2x equivalent moles of 4-hydroxyl benzoic acid) was then added dropwise. The mixture was refluxed for 20 hours and then 30 ml of 10% NaOH aqueous solution was added. The mixture was again heated to reflux for 2 hours, cooled to room temperature, concentrated and acidified with 6N HCl to obtain white precipitate. The white precipitate was filtered and recrystallized from ethanol and water. Yield: I-18: 72.3%; I-19: 82.7%; I-20: 82.4%.

$^1$H-NMR:

I-18: $^1$H-NMR (CDCl$_3$, TMS, δppm): 4.63(d,2H,—CH$_2$O),5.40(m,2H,—CH=CH$_2$),6.08(m,1H,—CH= CH$_2$), 6.98(m,2H, aromatic H) and 8.08(d,2H,aromatic H)

I-19: $^1$H-NMR (CDCl$_3$,TMS,δppm): 1.55–2.20(m,6H,—(CH$_2$)$_3$—CH$_2$O—),4.05(t,2H,—CH=O—), 5.02 (m, 2H,—CH=CH$_2$),5.85(m,1H,—CH=CH$_2$),6.92(d,2H, aromatic H) and 8.05(d,2H,aromatic H).

I-20: $^1$H-NMR (CDCl$_3$, TMS, δppm): 1.27–2.03 (m,16H, —(CH$_2$)$_8$—CH$_2$O—), 4.01(t,2H,—CH$_2$O—), 4.95 (m, 2H, —CH=CH$_2$),5.80(m,1H,—CH=CH$_2$),6.92(d,2H, aromatic H) and 8.05(d,2H,aromatic H).

PREPARATION EXAMPLE 21

Synthesis of (S)-2-methyl-1-butyl 6-hydroxyl-2-naphthalenecarboxylate (I-21)

In a flask equipped with a Dean-Stark trap 6.78 g (0.036 mole) 6-hydroxyl-2-naphthaleneformic acid, 4.76 g (0.054 mole) (S)-2-methyl-1-butanol, 0.2 ml sulfuric acid and 15 ml anhydrous benzene were charged and refluxed for about 15 hours until all the 4-hydroxybenzoic acid was dissolved. The esterification reaction mixture was cooled to room temperature, extracted with ethyl ether, and washed with 5% (w/w) sodium hydrogen carbonate aqueous solution. The ethyl ether layer was collected, concentrated, and purified with column chromatography (ethyl acetate/n-hexane) to obtained light yellow solid. Yield: 93%. The optical rotation: $[\alpha]^{25}_D$=+2.97 (c=1.0 g/dl, chloroform).

$^1$H-NMR (CDCl$_3$),TMS,δppm): 1.00–1.30(m,6H,—CH$_3$),1.30–2.10(m,3H,—CH—CH$_2$—CH$_3$), 4.20–4.44(dd, 2H,—COOCH$_2$—),7.30–8.20(m,6H, aromatic H).

PREPARATION EXAMPLES 22–24

Synthesis of:
4-(S)-2-methyl-1-butyl 2-(4-allyloxyphenylcarbonyloxy)naphthalene-6-carboxylate (I-22);
4-(S)-2-methyl-1-butyl 2-[4-(5-hexen-1-yloxy)phenylcarbonyloxy] naphthalene-6-carboxylate (I-23);
4-( S )-2-methyl-1 -butyl 2-[4-(10-undecen-1-yloxy)phenylcarbonyloxy]naphthalene-6-carboxylate (I-24)

Part (A): 0.0045 mole compound I-16 (preparation example 22), I-17 (preparation example 23) or I-18 (preparation example 24) was dissolved in 10 ml dichloromethane, several drops of dimethylformamide and 4 ml thionylchloride were added thereto and the resulting mixture was stirred to obtain a transparent solution. The solvent and excess thionylchloride were removed under reduced pressure to give yellow oily acyl chloride which was then dissolved in 20 ml anhydrous dichloromethane and added to part (B). Part (B): 1.54 g (0.0055 mole) compound I-21, 0.67 g (0.0055 mole) 4-(dimethylamino)pyridine (DMAP) and 30 ml anhydrous dichloromethane were mixed and placed in an ice water bath. Part (A) solution was added to part (B) dropwise, and the resulting mixture was stirred at room temperature for 12 hours after the addition was complete. The solvent was removed from the reaction mixture under reduced pressure, and the reaction product was then dissolved in dichloromethane and purified with a silica gel chromatography (ethyl acetate/n-hexane) to obtain a white solid product. Table 6 lists the yields, the optical rotations and $^1$H-NMR's of monomers I-22 to I-24.

PREPARATION EXAMPLES 25–27

Synthesis of:
4-Allyloxybiphenyl-4'-carboxylic acid (I-25);
4-(5-Hexen-1-yloxy)biphenyl-4'-carboxylic acid (I-26);
4-(10-Undecen-1-yloxy)biphenyl-4'-carboxylic acid (I-27).

The procedures of Preparation Examples 18–20 were repeated except that 6 g 4-hydroxyl benzoic acid was replaced by 9.3 g 4-hydroxybiphenyl-4'-carboxylic acid, Yield: I-25: 67%; I-26: 89.8%; I-27: 80.6%. $^1$H-NMR:

I-25: $^1$H-NMR(CD$_3$COCD$_3$, TMS, δppm): 4.60 (d,2H,—CH$_2$O—),5.40 (m,2H,—CH═CH$_2$), 6.08(m,1H,CH═CH$_2$),6.98–8.16(m,8H, aromatic H).

I-26: $^1$H-MMR(CD$_3$COCD$_3$, TMS, δppm): 1.50–2.18(m, 6H,—(CH$_2$)$_3$—),4.00(t,2H,—CH$_2$O—), 5.00 (m,2H,—CH═CH$_2$),5.82(m,1H,—CH═CH$_2$),6.93–8.18 (m,8H, aromatic H).

I-27: $^1$H-NMR(CD$_3$COCD$_3$, TMS, δppm): 1.20–2.21(m, 16H,—(CH$_2$)$_8$—),4.01(t,2H,—CH$_2$O—), 4.97(m,2H,—CH═CH$_2$),5.80(m,1H,—CH═CH$_2$),6.93–8.18 (m,8H, aromatic H).

PREPARATION EXAMPLES 28–30

Synthesis of:

4-(S)-2-methyl-1-butyl 2-(4-allyloxybiphenyl-4'-carbonyloxy)naphthalene- 6-carboxylate (I-28);
4-(S)-2-methyl-1-butyl 2-[4-(5-hexen- 1-yloxy)biphenyl-4'-carbonyloxyloxy] naphthalene-6-carboxylate (I-29);
4-(S)-2-methyl-1-butyl 2-[4-( 10-undecen-1-yloxy)biphenyl-4'-carbonyloxyloxy] naphthalene-6-carboxylate (I-30).

The procedures of Preparation Examples 22–24 were repeated except that compounds I-16, I-17 and I-18 were replaced by compounds I-25, I-26 and I-27 respectively. Table 7 lists the yields, the optical rotations and $^1$H-NMR's of monomers I-28 to I-30.

TABLE 6

Characterization of Monomers I-22–I-24

$$H_2C=CH\text{-}(CH_2)_{n-2}\text{-}O\text{-}\langle\text{Ph}\rangle\text{-}\overset{O}{\underset{\|}{C}}\text{-}O\text{-}\langle\text{Naph}\rangle\text{-}\overset{O}{\underset{\|}{C}}\text{-}O\text{-}CH_2\text{-}\overset{*}{\underset{|}{CH}}\text{-}C_2H_5 \quad (CH_3)$$

| Monomer | Yield (%) | $[\alpha]_D^{25}$ | 400MHz $^1$H-NMR(CDCl$_3$, δ, PPM) |
|---|---|---|---|
| I-22 | 73.4 | +3.05 | 0.92(t; 3H, —CH$_2$—C<u>H</u>$_3$), 0.99(d; 3H, —HCC<u>H</u>$_3$—CH$_2$—), 1.28–1.69(m; 2H, —C<u>H</u>$_2$—CH$_3$—), 1.94(m; 1H, —C<u>H</u>CH$_3$—), 4.25(m; 2H, —O—CH$_2$—CHCH$_3$—), 4.62(d; 2H, —C<u>H</u>$_2$—CH═), 5.38(q; 2H, <u>H</u>$_2$C═CH—), 6.11(m; 1H, H$_2$C═C<u>H</u>—), 6.92–8.60(m; 10H, aromatic protons). |
| I-23 | 87.7 | +2.81 | 0.92(t; 3H, —CH$_2$—C<u>H</u>$_3$), 0.99(d; 3H, —HCC<u>H</u>$_3$—CH$_2$—), 1.20–1.91(m; 9H, —C<u>H</u>$_2$—CH$_3$—, —C<u>H</u>CH$_3$— and —CH$_2$—(C<u>H</u>$_2$)$_3$—CH$_2$—), 2.12(q; 2H, —C<u>H</u>$_2$—CH═), 4.02(t; 2H, —OC<u>H</u>$_2$—CH$_2$—), 4.18(m; 2H, —O—C<u>H</u>$_2$—CHCH$_3$—), 4.95(q; 2H, <u>H</u>$_2$C═CH—), 5.78(m; 1H, H$_2$C═C<u>H</u>—), 6.92–8.58(m; 10H, aromatic protons). |
| I-24 | 86.7 | +2.69 | 0.92(t; 3H, —CH$_2$—C<u>H</u>$_3$), 0.99(d; 3H, —HCC<u>H</u>$_3$—CH$_2$—), 1.28–2.01(m; 17H, —C<u>H</u>$_2$—(C<u>H</u>$_2$)$_7$—CH$_2$—, —C<u>H</u>$_2$—CH$_3$—, and —C<u>H</u>CH$_3$—), 2.16(q; 2H, —C<u>H</u>$_2$—CH═), 4.05(t; 2H, —O—C<u>H</u>$_2$—CH$_2$—), 4.25(m; 2H, —O—C<u>H</u>$_2$—CHCH$_3$—), 4.95(q; 2H, <u>H</u>$_2$C═CH—), 5.80 (m; 1H, H$_2$C═C<u>H</u>—), 6.92–8.60(m; 10H, aromatic protons). |

TABLE 7

Characterization of Monomers I-28~I-30

$$H_2C=CH\mathrm{-(CH_2)_{\overline{n-2}}}-O-\underset{}{\bigcirc}-\underset{}{\bigcirc}-\underset{\underset{O}{\|}}{C}-O-\underset{}{\bigcirc\bigcirc}-\underset{\underset{O}{\|}}{C}-O-CH_2-\underset{*}{\overset{CH_3}{\underset{|}{CH}}}-C_2H_5$$

| Monomer | Yield (%) | $[\alpha]_D^{25}$ | 400MHz $^1$H-NMR(CDCl$_3$, δ, PPM) |
|---|---|---|---|
| I-28 | 61.3 | +3.41 | 0.99(t; 3H, —CH—C$\underline{H}_3$), 1.07(d; 3H, —HCC$\underline{H}_3$—CH$_2$—), 1.28~1.69(m; 2H, —C$\underline{H}_2$—CH$_3$—), 1.94(m; 1H, —C$\underline{H}$CH$_3$—), 4.25(m; 2H, —O—C$\underline{H}_2$—CHCH$_3$—), 4.61(d; 2H, —C$\underline{H}_2$—CH=), 5.39(q; 2H, $\underline{H}_2$C=CH—), 6.10(m; 1H, H$_2$C=C$\underline{H}$—), 7.04~8.64(m; 14H, aromatic protons). |
| I-29 | 63.5 | +3.17 | 0.99(t; 3H, —CH—C$\underline{H}_3$), 1.07(d; 3H, —HCC$\underline{H}_3$—CH$_2$—), 1.30~1.97(m; 9H, —C$\underline{H}_2$—CH$_3$— and —C$\underline{H}$CH$_3$— and —CH$_3$—(C$\underline{H}_2$)$_3$—CH$_2$—), 2.15(q; 2H, —C$\underline{H}_2$—CH=), 4.02 (t; 2H, —OC$\underline{H}_2$—CH$_2$—), 4.25(m; 2H, —O—C$\underline{H}_2$—CHCH$_3$—), 5.02(q; 2H, $\underline{H}_2$C=CH—), 5.85(m; 1H, H$_2$C=C$\underline{H}$—), 6.99~8.62(m; 14H, aromatic protons). |
| I-30 | 83.7 | +2.85 | 0.92(t; 3H, —CH—C$\underline{H}_3$), 0.99(d; 3H, —HCC$\underline{H}_3$—CH$_2$—), 1.28~2.00(m; 17H, —CH$_2$—(C$\underline{H}_2$)$_7$—CH$_2$—, —C$\underline{H}_2$—CH$_3$—, and —C$\underline{H}$CH$_3$—), 2.15(q; 2H, —C$\underline{H}_2$—CH=), 4.05(t; 2H, —O—C$\underline{H}_2$—CH$_2$—), 4.25(m; 2H, —O—C$\underline{H}_2$—CHCH$_3$—), 4.95(q; 2H, $\underline{H}_2$C=CH—), 5.80 (m; 1H, H$_2$C=C$\underline{H}$—), 6.90~8.60(m; 14H, aromatic protons). |

Examples 7–9

Synthesis of:

Poly[methyl[4-(S)-2-methyl-1-butyl 2-( 4-allyloxyphenyl-carbonyloxy)naphthalene-6-carboxylate]siloxane](P-7);

Poly[methyl[4-(S)-2-methyl-1-butyl 2-[ 4-(5-hexen-1-yloxy)phenylcarbonyloxy] naphthalene-6-carboxylate]siloxane](P-8);

Poly[methyl[4-(S)-2-methyl-1-butyl 2-[ 4-(10-ucdecen-1-yloxy)phenylcarbonyloxy]naphthalene- 6-carboxylate]siloxane](P-9).

Polymethylhydrogensiloxane having a number average molecular weight of 4500–5000 obtained from Petrarch Systems Inc., Bristal, Pa., U.S.A. was used in these examples. 1.15 equivalent moles of compound I-22 (example 7), I-23 (example 8) or I-24 (example 9) was dissolved in an suitable amount of toluene together with polymethylhydrogensiloxane. The reaction was carried out at about 80° C. in the presence of platinum divinyltetramethyldisiloxane complex catalyst. FT-IR analysis was run to detect the absorption peak of Si-H bond (2180 cm$^{-1}$) of the reaction mixture. The hydrosilation reaction was complete when the Si-H absorption peak disappeared. The reaction mixture was concentrated and then dissolved in small amount of THF. Methanol was added to the resulting solution dropwise to precipitate the product. The reprecipitation was repeated several times to purify the polymer product. The purified polymer was further subjected to preparative GPC or thin layer chromatography (TLC) to detect whether the purified polymer was free of any residual monomers or oligomers. The reprecipitation was repeated until the GPC or TLC showed no residual monomers or oligomers existing in the purified polymer.

Table 8 shows the m and n values of the synthesized polymers P-7 to P-9 in the above formula (I).

TABLE 8

| Example | Monomer | Polymer | m | n |
|---|---|---|---|---|
| 7 | I-22 | P-7 | 80 | 1 |
| 8 | I-23 | P-8 | 80 | 4 |
| 9 | I-24 | P-9 | 80 | 9 |
| 10 | I-28 | P-10 | 80 | 1 |
| 11 | I-29 | P-11 | 80 | 4 |
| 12 | I-30 | P-12 | 80 | 9 |

Examples 10–12

Synthesis of:

Poly[methyl[4-(S)-2-methyl-1-butyl 2-(4-allyloxybiphenyl-4'-carbonyloxy)naphthalene- 6-carboxylate]siloxane](P-10);

Poly[methyl[4-(S)-2-methyl-1-butyl 2-[ 4-(5-hexen-1-yloxy)biphenyl-4'-carbonyloxy] naphthalene-6-carboxylate]siloxane](P-11);

Poly[methyl[4-(S)-2-methyl-1 -butyl 2-[ 4-(10-ucdecen-1-yloxy)biphenyl-4'-carbonyloxy]naphthalene-6-carboxylate]siloxane](P-I2).

The procedures of Examples 7-9 were repeated except that compounds I-22, I-23 and I-24 were replaced by compounds I-28 (example 10), I-29 (example 11) and I-30 (example 12) respectively.

The m and n values of the synthesized polymers P-10 to P-12 in the above formula (I) are shown in Table 8.

The monomers I-22 to I-24, I-28 to I-30 and polymers P-7 to P-12 were characterized by differential scanning calorimetry and optical polarizing microscopy.

Table 9 present the thermal transitions and thermodynamic parameters of the synthesized monomers I-22 to I-24 and I-28 to I-30. Table 10 present the thermal transitions and thermodynamic parameters of the synthesized polymers 7-12.

Figure 20A:
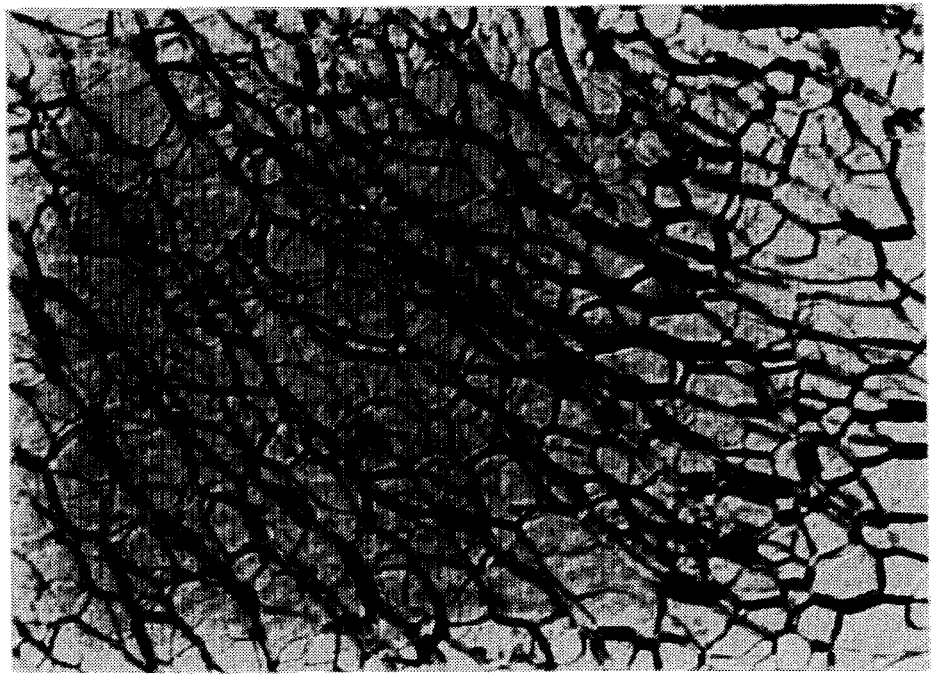
FIG. 20(A), (B) are optical polarizing micrographs of monomer I-22: (A) cholesteric texture obtained at 83° C.; (B) smectic A texture obtained at 66.3%.
Figure 20B:
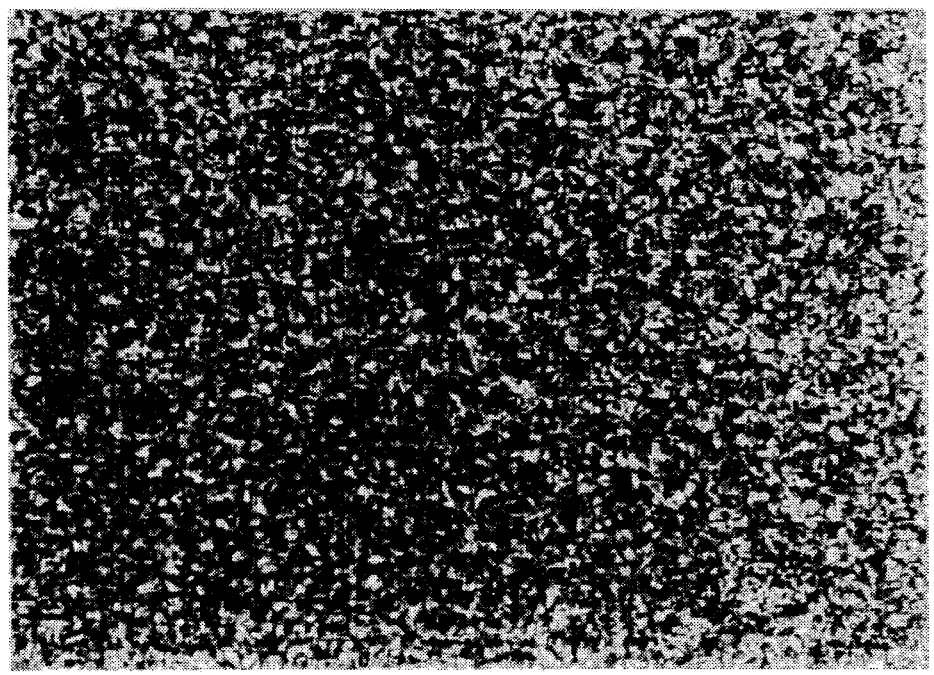
Figure 21A:
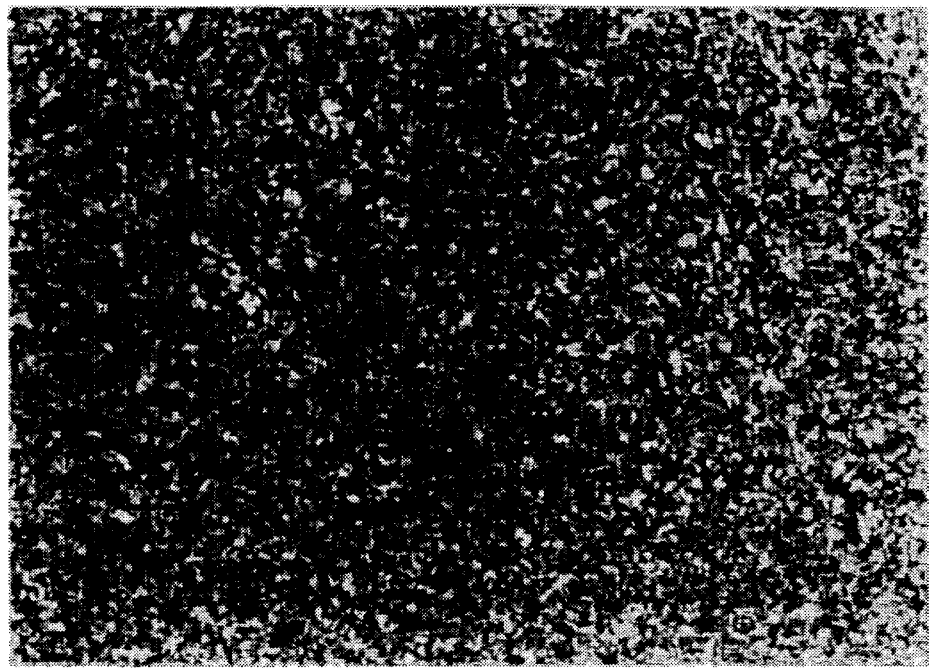
FIGS. 21(A) and (B) are the optical polarizing micrographs of monomer I-23: (A) the cholesteric texture obtained at 87° C. on cooling; (B) the smectic A texture obtained at 78.4%. on cooling.
Figure 21B:
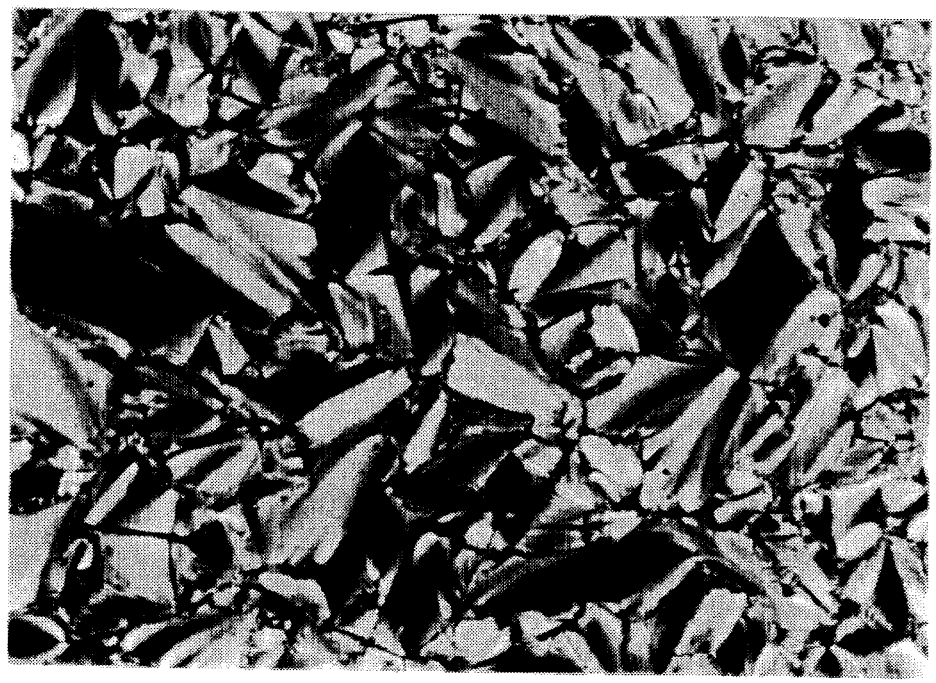

Monomers I-22 and I-23 have the same types of liquid crystalline phase. The mesomorphic ranges of the monomers I-22 and I-23 are also similar to each other. On cooling scan, the optical polarizing micrograph of monomer I-22 taken at 83° C., FIG. 20(A), displays an oily streaks texture of cholesteric phase (also named chiral nematic phase, N*), and the optical polarizing micrograph taken at 66.3° C., FIG. 20(B), displays a focal-conic fan texture of smectic A phase. However, monomer I-22 in the optical polarizing microscopy exhibits only the oily streaks texture of cholesteric phase on the heating scan. Monomer I-23 in the optical polarizing microscopy exhibits a cholesteric phase and a smectic A phase on both the heating scan and cooling scan. FIGS. 21(A) and (B) are the optical polarizing micrographs of monomer I-23: (A) the cholesteric texture obtained at 87° C. on cooling; (B) the smectic A texture obtained at 78.4° C. on cooling. The crystallization temperature of monomer I-23 is about 20° C. lower than that of monomer I-22 on the cooling scans, and this may be because monomer I-23 has a longer spacer than I-22.

TABLE 9

Phase transitions and phase transition enthalpies for monomers I-22 to I-24 and I-28 to I-30

Phase transitions, °C. (Corresponding enthalpy changes, Kcal/mol)

Heating

| Monomers | n | Cooling |
|---|---|---|
| I-22 | 1 | K 75.3 (5.58) N* 87.6 (0.06) I |
| | | I 84.5 (0.11) N* 51.8 (—) $S_A$ 39.5 (5.53) K |
| I-23 | 4 | K 77.5 (5.44) $S_A$ 86.3 (2.40) N* 91.0 (0.10) I |
| | | I 88.9 (0.81) N* 84.2 (3.31) $S_A$ 30.5 (4.48) K |
| I-24 | 9 | K 63.1 (8.03) Sc* 78.5 (—) $S_A$ 97.5 (1.41) I |
| | | I 95.3 (1.37) $S_A$ 65.1 (—) Sc* 9.4 (5.01) K |
| I-28 | 1 | K 127.2 (4.273) Sc* 164.8 (0.50) $S_A$ 205.7 (0.10) I |
| | | I 205.7 (0.11) $S_A$ 162.1 (0.71) Sc* 86.9 (3.24) K |
| I-29 | 4 | K 127.9 (7.20) Sc* 156.1 (0.60) $S_A$ 202.4 (0.19) I |
| | | I 199.6 (0.20) $S_A$ 151.3 (1.80) Sc* 85.6 (6.41) K |
| I-30 | 9 | K 76.9 (11.34) Sc* 161.4 (—) $S_A$ 212.5 (1.22) I |
| | | I 209.1 (1.07) $S_A$ 160.4 (—) Sc* 50.9 (6.05) K |

K = crystalline, $S_A$ = smectic A, Sc* = chiral smectic C, N* = chiral nematic, I = isotropic.

Figure 6:
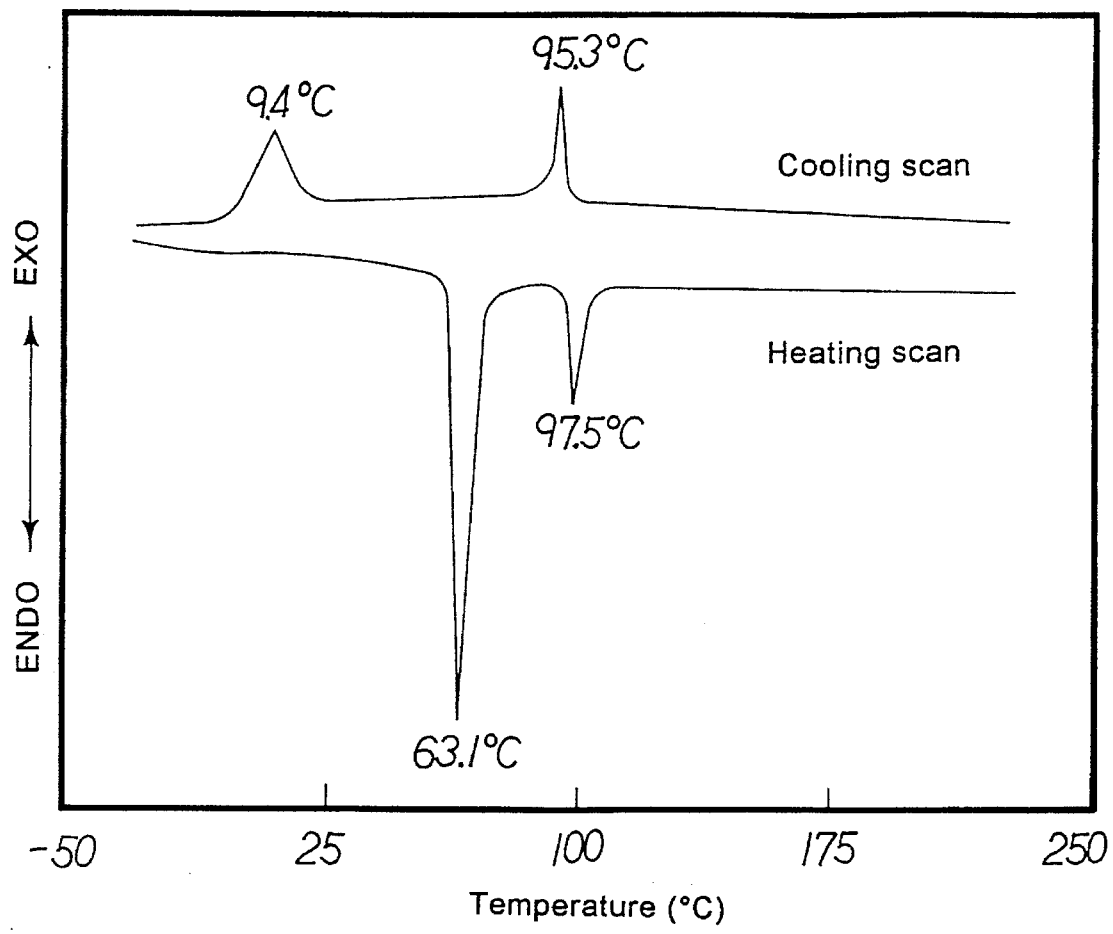
FIG. 6 are Differential Scanning Calorimeter (DSC) thermograms (10° C./min) for monomer I-24.
Figure 22A:
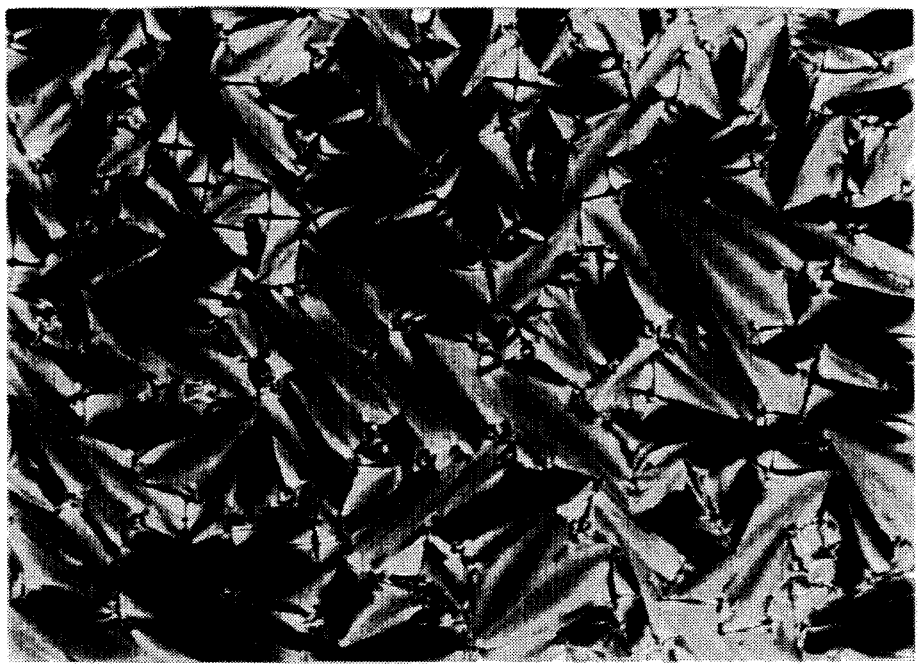
FIGS. 22(A) and (B) are the optical polarizing micrographs of monomer I-24: (A) the focal-conic fan smectic A texture obtained at 92° C. on cooling; (B) the broken fan texture of chiral smectic C phase obtained at 40° C. on cooling.
Figure 22B:
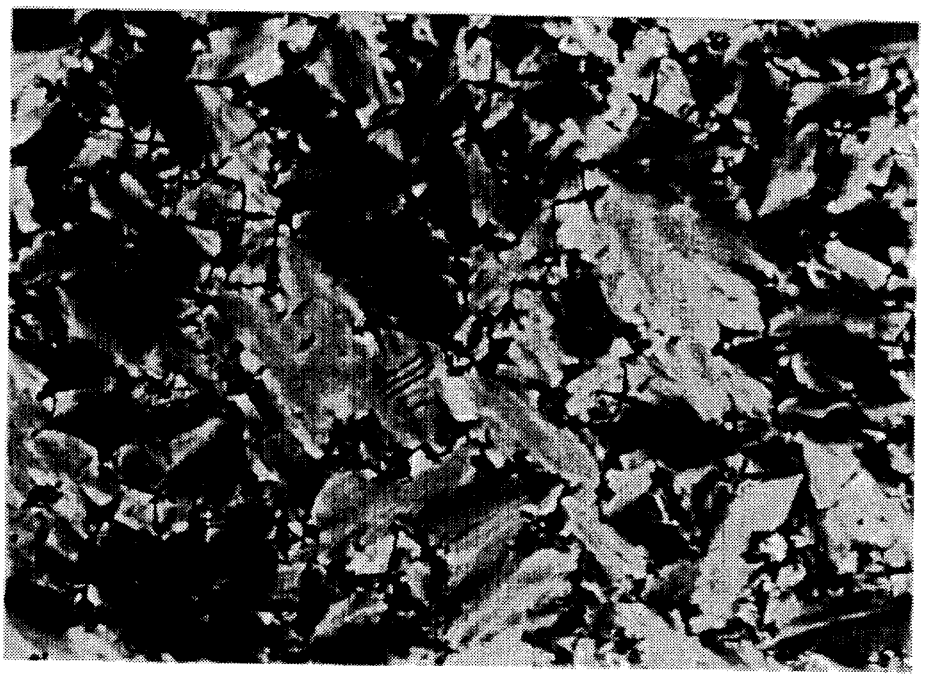

Monomer I-24 in the optical polarizing microscopy does not exhibit a cholesteric phase, when it is cooled from its isotropic phase temperature. First, the monomer I-24 exhibits a focal-conic fan texture of smectic A phase. The focal-conic fan texture gradually change its color as the temperature is near 65° C., and finally become a broken focal-conic fan texture of smectic C phase when monomer I-24 is further cooled. On the heating scan, the smectic C phase of monomer I-24 exhibited in the optical polarizing microscopy changes to a smectic A phase as the temperature reaches 78.5° C. The phase transition between smectic A and smectic C basically pertains to a second order phase transition, which involves a very small enthalpy change, about 0.1 Kcal/mol or less, and is very difficult to be identified from DSC traces. FIG. 6 is the DSC thermograms of monomer I-24, and FIGS. 22(A) and (B) are the optical polarizing micrographs of monomer I-24: (A) the focal-conic fan smectic A texture obtained at 92° C. on cooling; (B) the broken fan texture of chiral smectic C phase obtained at 40° C. on cooling.

Monomers I-22 to I-24 all have a phenylene group and a naphthalene group, and tend to form a cholesteric phase and a smectic A phase. The mesomorphic ranges thereof are relatively narrow. Among them tilted smectic C phase may be formed when carbon atom number n of the spacer in the formula (I) is 9.

TABLE 10

Phase Transitions and Phase Transition Enthalpies for Polymers P7-P12

Phase transitions, °C. (Corresponding enthalpy changes, Kcal/mru)

Heating

| Polymers | n | Cooling |
|---|---|---|
| P-7 | 1 | G 22.1 S 155.2 (0.23) I |
| | | I 149.6 (0.08) S 22.8 G |
| P-8 | 4 | G 10.61 S 132.6 (0.25) I |
| | | I 127.6 (0.26) S 0.7 G |
| P-9 | 9 | G −16.8 K 74.9 (0.31) S 148.1 (1.39) I |
| | | I 144.6 (1.42) S 53.3 (0.29) K −12.7 G |
| P-10 | 1 | G 15.1 S 151.3 (0.29) I |
| | | I 150.4 (0.39) S 11.9 G |
| P-11 | 4 | G 6.9 S 285.6 (1.51) I |
| | | I 283.2 (2.51) S 6.9 G |
| P-12 | 9 | G 1.0 K 67.3 (0.33) $S_1$ 154.4 (0.36) $S_2$ 326.7 (0.99) I |
| | | I 311.5 (0.62) $S_2$ 146.8 (0.23) $S_1$ 47.5 (0.39) K −0.8 G | mru = mole repeating unit, K = crystalline, S = smectic, G = glassy, I = isotropic.

Figure 7:
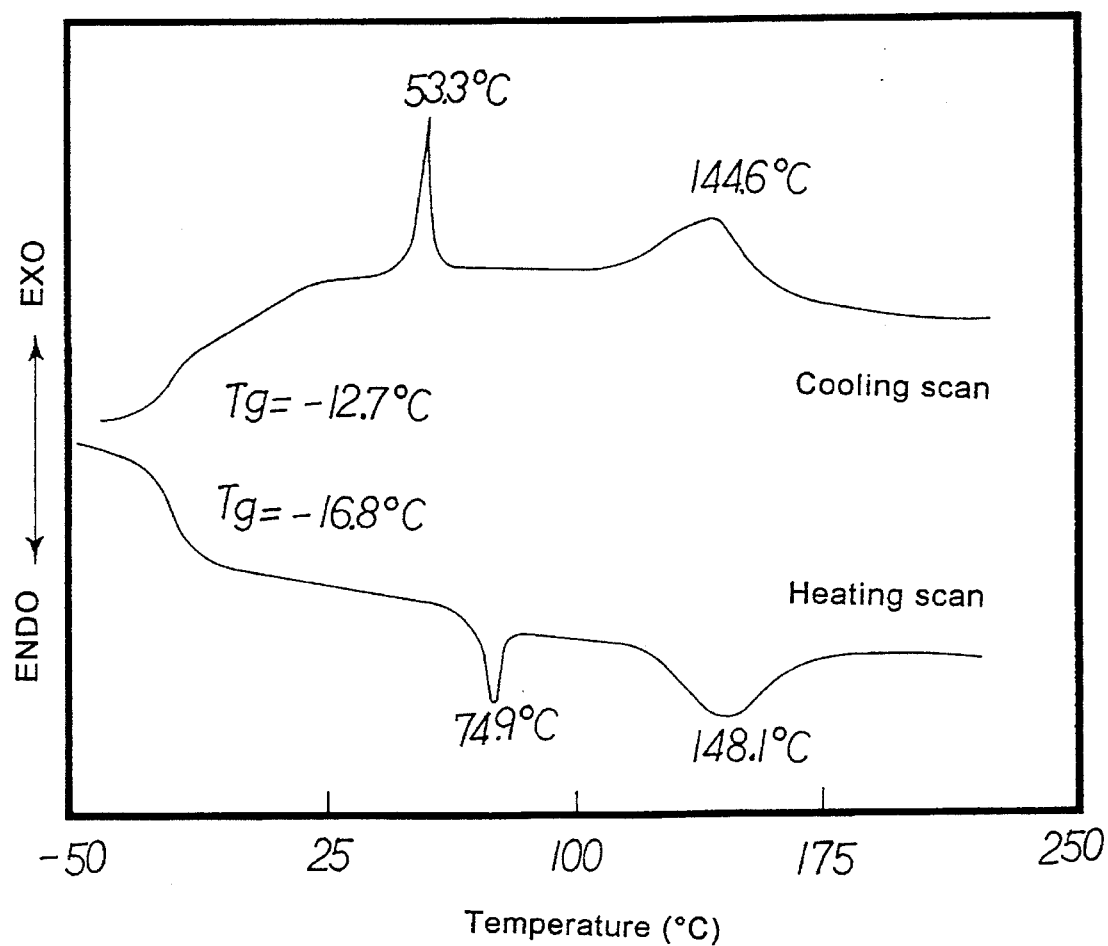
FIG. 7 are Differential Scanning Calorimeter (DSC) thermograms (10° C./min) for polymer P-9.
Figure 23A:
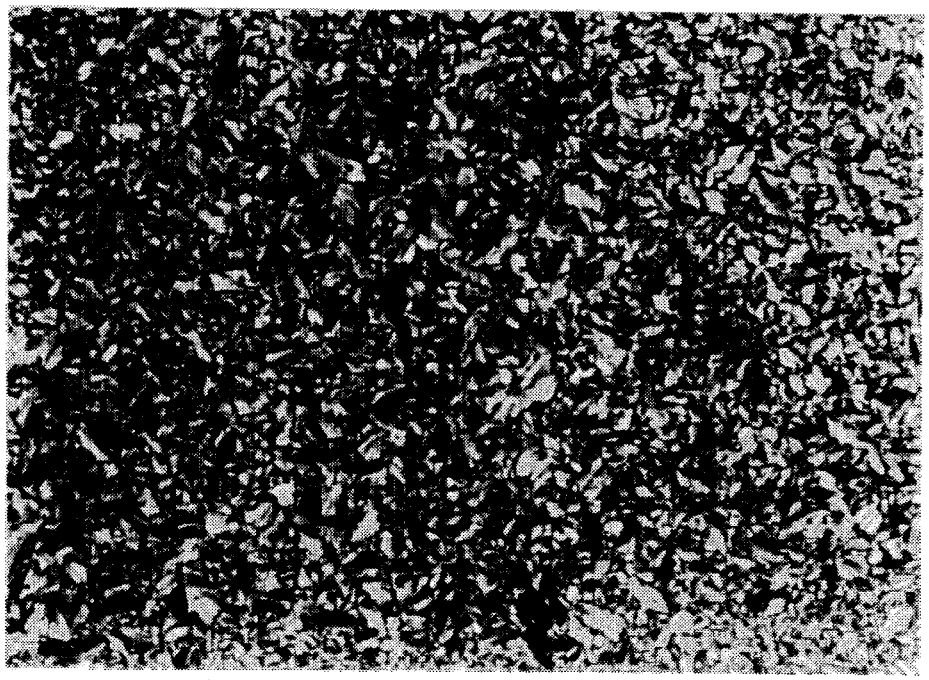
FIGS. 23 (A) and (B) are the optical polarizing micrographs of polymer P-9: (A) fan-like texture of smectic A phase obtained at 98° C. on cooling; (B) broken fan texture obtained at 30° C.
Figure 23B:
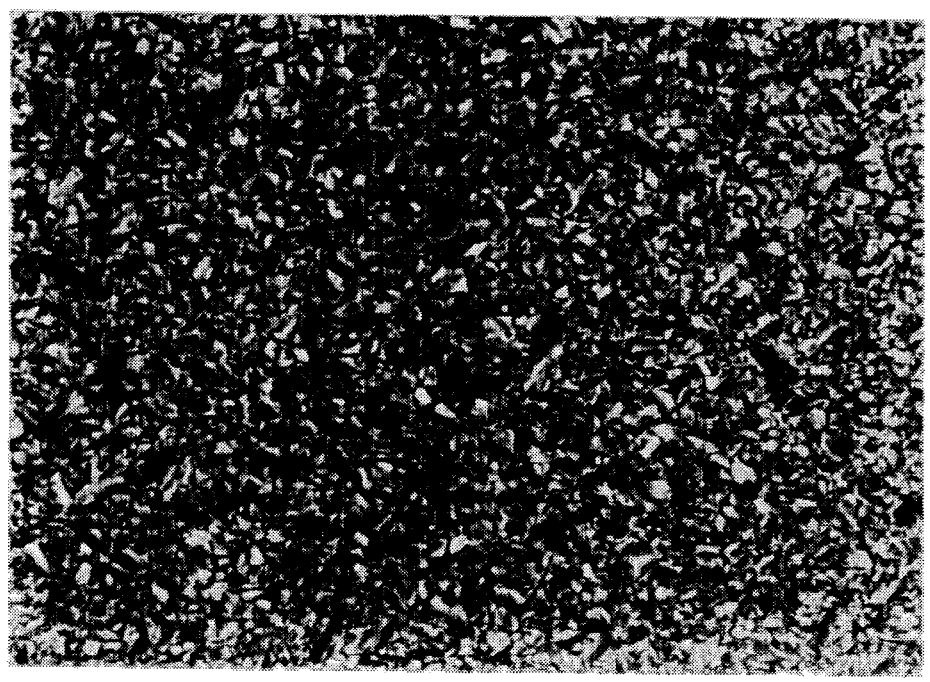

The mesomorphic ranges of polymers P-7 to P-9 are wider compared to the corresponding monomers I-22 to I-24. It can be seen from Table 10 that the glass transition temperature decreases as the carbon atom number of the, spacer thereof increases, and the liquid crystalline phase temperature extends to a lower temperature as the carbon atom number of the spacer thereof increases. The isotropic phase temperature of polymer P-8 is slightly lower that of polymer P-7, and the mesomorphic range of P-8 is about the same as that of P-7. Both polymers P-7 and P-8 in the optical polarizing microscopy exhibit a texture like sandstone, and the type of mesophase thereof is very difficult to be identified, and thus the transition between two different types of mesophase is also not able to be observed. The sandstone-like texture is believed pertaining to a smectic A phase after the magnification times of the optical polarizing microscope being increased. FIG. 7 shows DSC thermograms of polymer P-9. On heating scan trace in FIG. 7 there are one glass transition appearing at −16.8° C. and two thermal transitions appearing at 74.8° C. and 148.1° C. On cooling scan trace in FIG. 7 the two thermal transition appear at 144.6° C. and 53.3° C. FIGS. 23 (A) and (B) are the optical polarizing micrographs of polymer P-9: (A) fan-like texture of smectic A phase obtained at 98° C. on cooling; (B) broken fan texture obtained at 30° C. on cooling.

Figure 8:
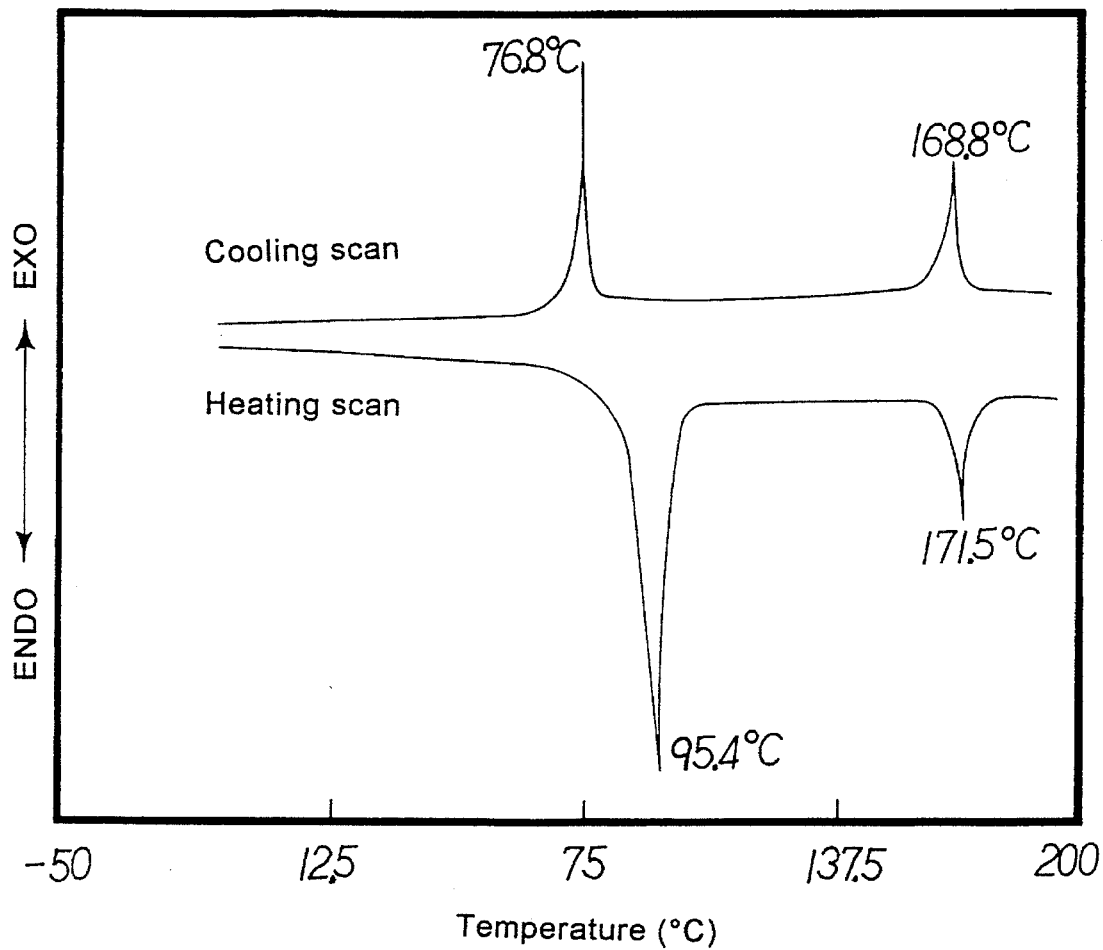
FIG. 8 are Differential Scanning Calorimeter (DSC) thermograms (10° C./min) for monomer I-30.
Figure 24A:
FIGS. 24 (A) and (B) are the optical polarizing micrographs of monomer I-28: (A) cholesteric texture obtained at 203° C. on cooling; (B) chiral smectic C texture obtained at 145° C. on cooling.
Figure 24B:
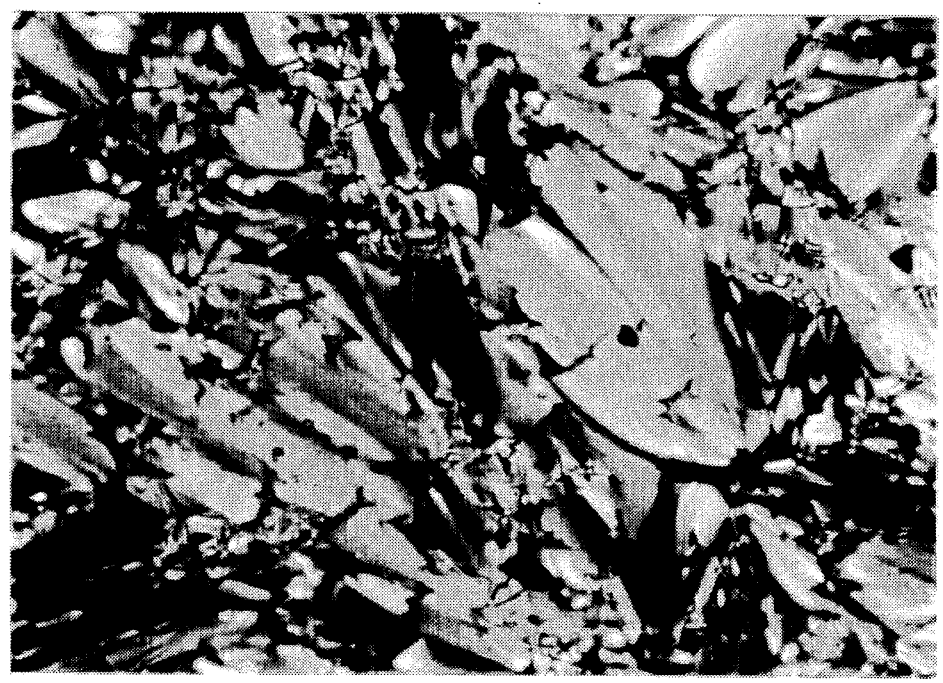
Figure 25A:
FIGS. 25 (A) and (B) are the optical polarizing micrographs of monomer I-29: (A) smectic A texture obtained at 170° C. on cooling; (B) chiral smectic C texture obtained at 148° C. on cooling.
Figure 25B:
Figure 26A:
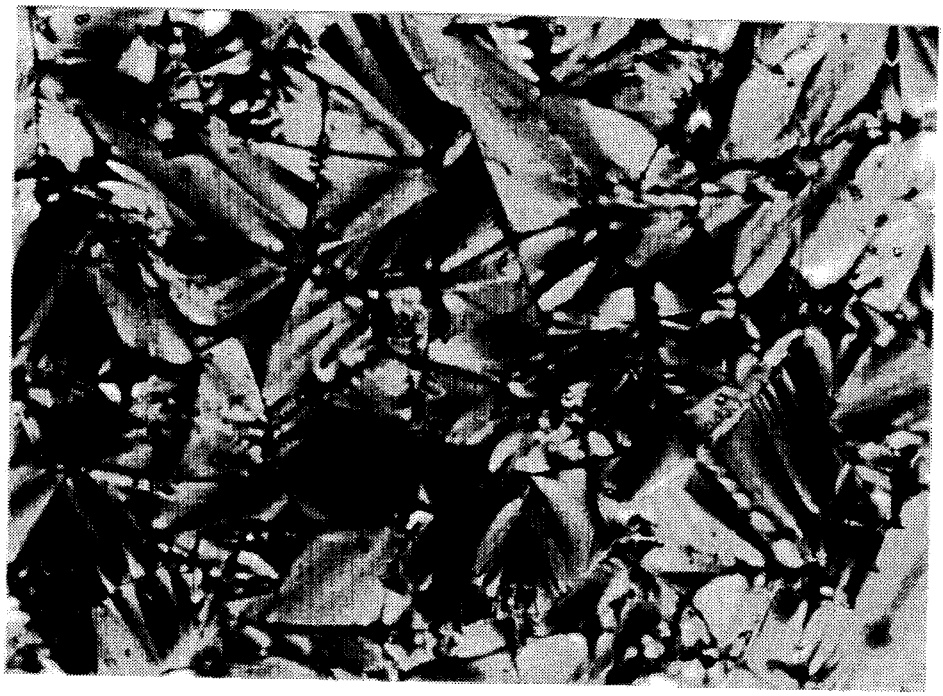
FIGS. 26 (A) and (B) are the optical polarizing micrographs of monomer I-30: (A) smectic. A texture obtained at 181° C. on cooling; (B) chiral smectic C texture obtained at 124° C. on cooling.
Figure 26B:
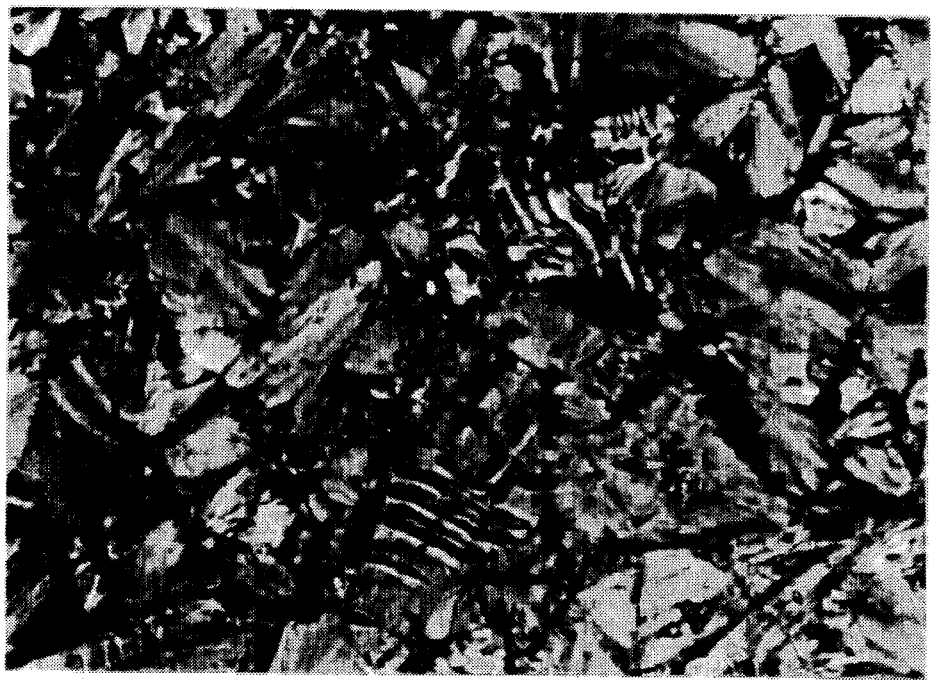

Monomers I-28 to I-30 have one biphenylene group and one naphthalene group, which have an additional phenyl ring in comparison with monomers I-22 to I-24. Among monomers I-28 to I-30, monomer I-28 and I-29 have substantially the same mesomorphic range similar to monomers I-22 and I-23 in the group of monomers I-22 to I-24. However, the temperatures of the mesomorphic ranges of monomers I-28 and I-29 are higher than those of monomers I-22 and I-23. In the optical polarizing microscopy both monomers I-28 and I-29 exhibit a fan texture of smectic A phase when they are cooled from their isotropic phase temperature. The fan texture of monomer I-28 starts breaking at a temperature near 163° C., and 151° C. for monomer I-2.9. FIGS. 24 (A) and (B) are the optical polarizing micrographs of monomer I-28: (A) cholesteric texture obtained at 203° C. on cooling; (B) chiral smectic C texture obtained at 145° C. on cooling. FIGS. 25 (A) and (B) are the optical polarizing micrographs of monomer I-29: (A) smectic A texture obtained at 170° C. on cooling; (B) chiral smectic C texture obtained at 148° C. on cooling. Monomers I-28 and I-29 crystallize at a temperature near 86° C. On heating scan both monomers I-28 and I-29 start melting at a temperature near 127° C. The transition from smectic A phase to smectic C phase of monomers I-28 and I-29 can be observed in both the optical polarizing microscopy and DSC thermograms, the enthalpy changes of which are within 2 Kcal/mol. Monomer I-30 which has the longest spacer in the group of monomers I-28 to I-30 has the widest mesomorphic range, the lowest crystallization temperature and the highest isotropic phase temperature. The temperature range of smectic C phase of monomer I-30 extends to a relatively low temperature. The transition from smectic A phase to smectic C phase of monomer I-30 can not be observed in DSC thermograms; however, it can be seen in the optical polarizing microscopy. FIG. 8 shows DSC thermograms of monomer I-30. FIGS. 26 (A) and (B) are the optical polarizing micrographs of monomer I-30: (A) smectic A texture obtained at 181° C. on cooling; (B) chiral smectic C texture obtained at 124 ° C. on cooling.

From the DSC arid optical polarizing microscopy analyses for both groups of monomers I-22 to I-24 and I-28 to I-30, it can be understood that the introduction of biphenylene group in monomers I-28 to I-30 is helpful in the formation of a stable smectic C phase and enhance the thermal stability of mesophase compared to the monomers I-22 to I-24 having a phenylene group instead of the biphenylene group. Therefore, a monomer having four aromatic rings is more suitable to be used as a mesogenic unit for a relatively high temperature.

Figure 9:
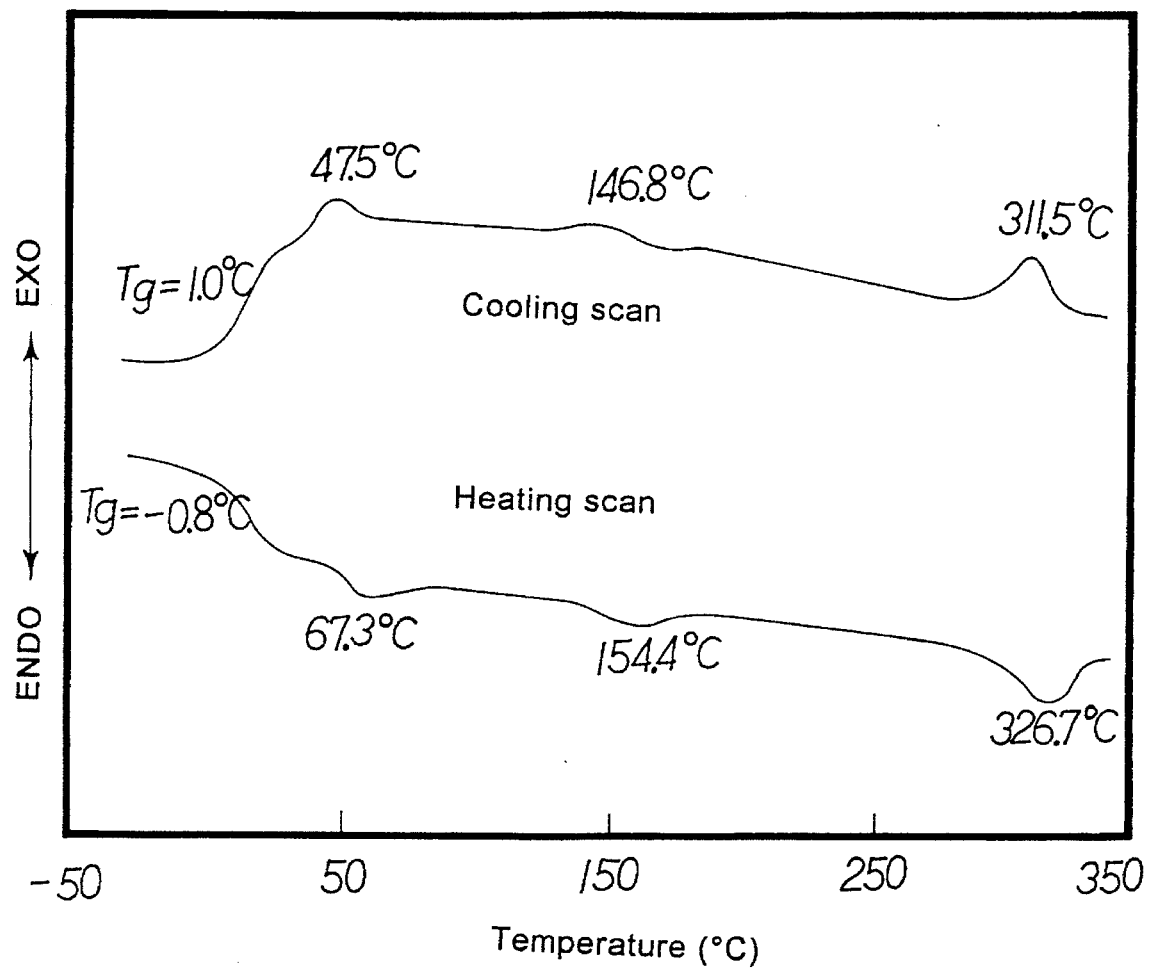
FIG. 9 are Differential Scanning Calorimeter (DSC) thermograms (10° C./min) for polymer P-12.
Figure 27A:
FIGS. 27 (A) and (B) are the optical polarizing micrographs of polymer P-12: (A) smectic A texture obtained at 275° C. on cooling; (B) chiral smectic C texture obtained at 122° C. on cooling.
Figure 27B:
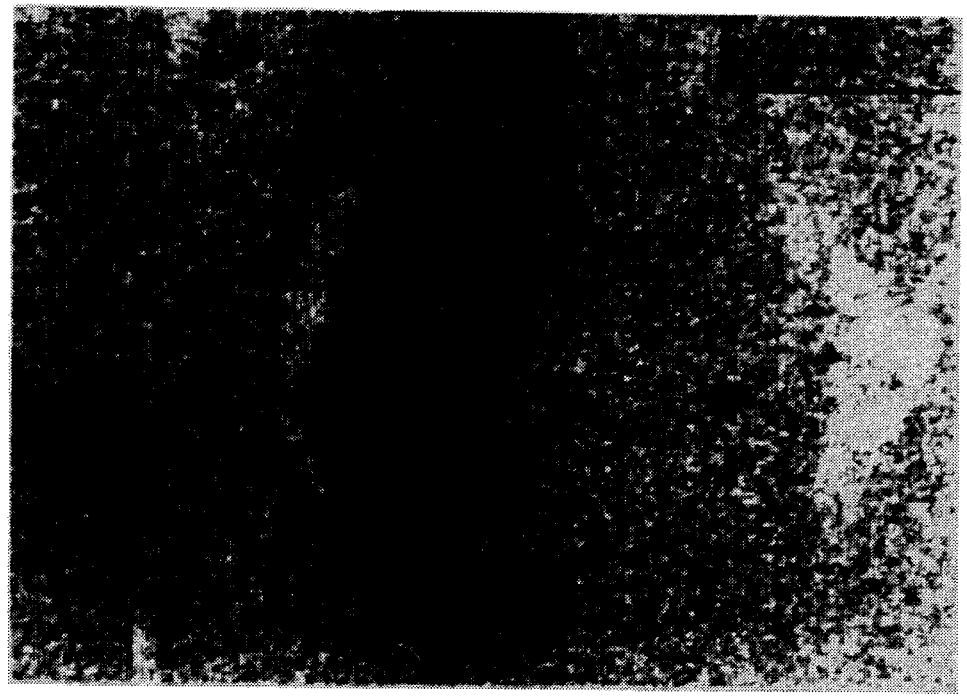

Each one of polymers P-10 to P-12 has a broader mesomorphic range than that of the corresponding monomer in I-28 to I-30. Among polymers P-10 to P-12 the one which has the longest spacer, namely polymer P-12, has the lowest glass transition temperature and the highest isotropic phase temperature. Polymer P-12 has an isotropic phase temperature even higher than 300° C. Polymer P-10 has an isotropic phase temperature lower titan that of the corresponding monomer I-28. The reason of that may be the arrangement of side-chain mesogenic units of polymer P-10 is affected by the polymer backbone due to a short spacer so that the stability of mesophase is reduced. Polymers P-10 to P-12 have relatively high viscosities and a poor flowing ability due to existence of four aromatic rings in their structure. In the optical polarizing microscopy polymers P-10 to P-12 all exhibit a texture like sandstone, as a result the types of the liquid crystalline phase thereof are very difficult to be identified. However, polymers P-10 to P-12 are believed having a smectic mesophase from their DSC thermograms. The DSC thermograms of polymer P-12 show a phenomenon similar to the formation of side-chain crystallization, and a phase transition zone having a relatively wide range in which there may exist two different types of smectic phase. The enthalpy changes of the phase transitions of polymer P-12 are within 0.5 Kcal/mol. FIG. 9 shows DSC thermograms of polymer P-12. FIGS. 27 (A) and (B) are the optical polarizing micrographs of polymer P-12: (A) smectic A texture obtained at 275° C. on cooling; (B) chiral smectic C texture obtained at 122° C. on cooling. The above analyses of polymers P-10 to P-12 show that the present invention can synthesize a chiral smectic C liquid crystalline polymer.

Figure 10:
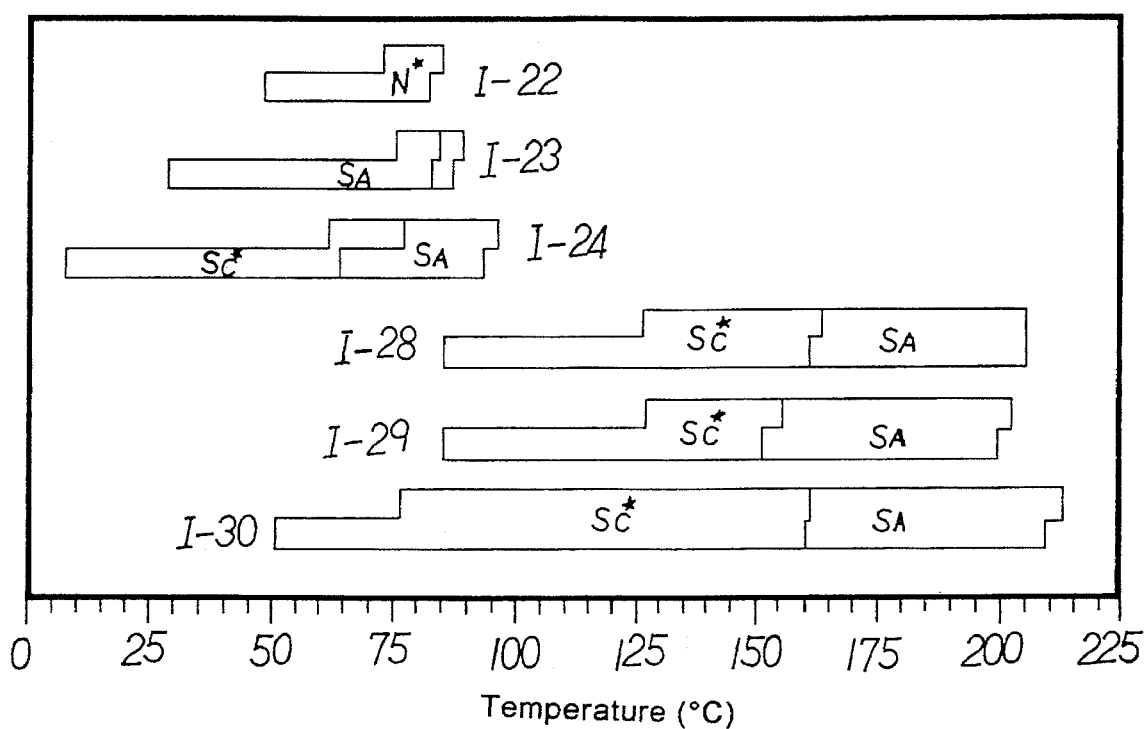
FIG. 10 is a plot which shows mesomorphic ranges of monomers I-22 to I-24 and monomers I-28 to I-30: N*: chiral nematic phase; $S_A$: smectic A phase; and Sc*: chiral smectic C phase.
Figure 11:
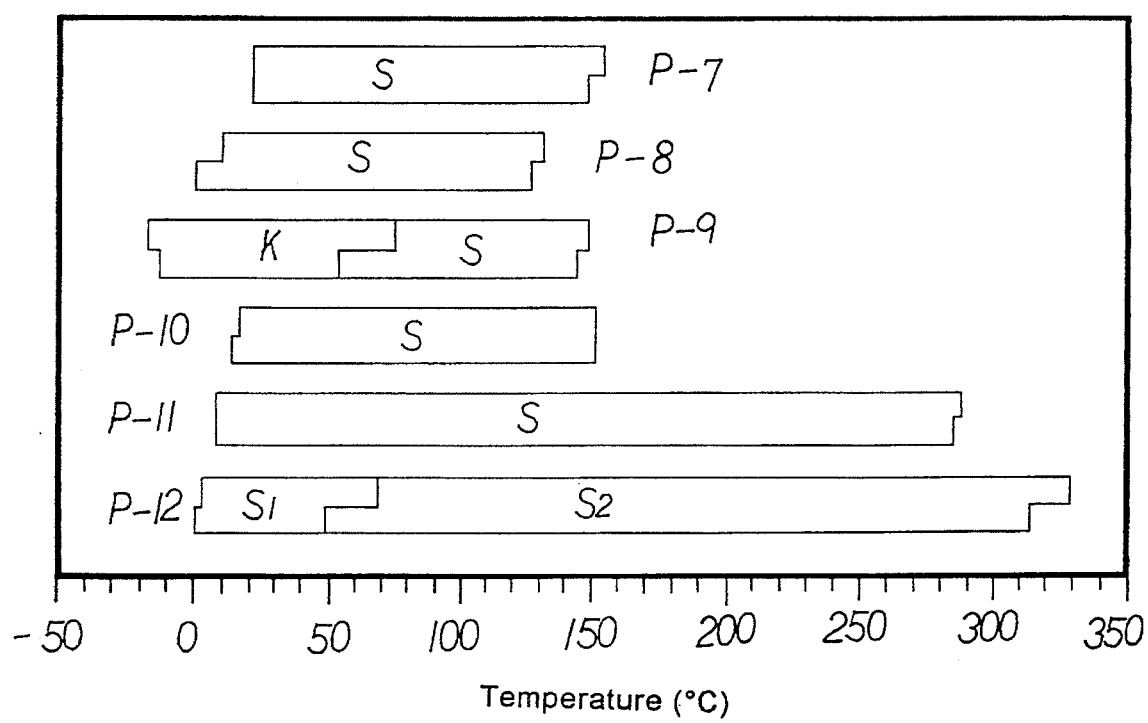
FIG. 11 is a plot which shows mesomorphic ranges of polymers P-7 to P-12: S: smectic phase; K: crystalline phase; $S_1$: smectic A phase; and $S_2$: chiral smectic C phase.

FIG. 10 shows the mesomorphic ranges of monomers I-22 to I-24 and I-28 to I-30. FIG. 11 shows the mesomorphic ranges of polymers P-1 to P-12.

In the following Table 11, the Ar, Ar', X and R of polymers P-1 to P-12 in the formula (I) are listed.

TABLE 11

| Example | Polymer | Ar | Ar' | X | R |
|---|---|---|---|---|---|
| 1–3 | P-1–P-3 |  |  | —Cl | —CH$_2$—CH(CH$_3$)—CH$_3$ |
| 4–6 | P-4–P-6 | 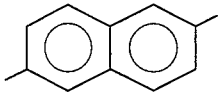 |  | —Cl | —CH(CH$_3$)—CH$_2$—CH$_3$ |
| 7–9 | P-7–P-9 | 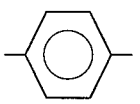 | 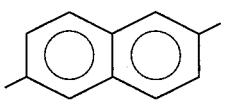 | —CH$_3$ | —C$_2$H$_5$ |

TABLE 11-continued

| Example | Polymer | Ar | Ar' | X | R |
|---|---|---|---|---|---|
| 10–12 | P-10–P-12 | —⟨phenyl⟩—⟨phenyl⟩— | naphthalene | —CH₃ | —C₂H₅ |

What is claimed is:

1. A liquid crystalline polysiloxane having the following formula:

$$Me_3SiO\text{--}(Si(CH_3)\text{--}O)_m\text{--}SiMe_3$$

with side chain: $CH_2\text{--}(CH_2)_n\text{--}O\text{--}Ar\text{--}C(=O)\text{--}O\text{--}Ar'\text{--}C(=O)\text{--}O\text{--}CH_2\text{--}CH(X)\text{--}R$ wherein Me is methyl;
m is an integer of 40 to 80;
n is an integer of 1 to 12;
Ar' is phenylene or naphthalene;
Ar is phenylene, biphenylene or naphthalene provided that Ar is not biphenylene and is not phenylene when Ar' is phenylene;
X is halogen or methyl; and
R is $C_1$–$C_4$ alkyl.

2. A liquid crystalline polysiloxane according to claim 1 wherein n is an integer of 1 to 9.

3. A liquid crystalline polysiloxane according to claim 1 wherein Ar is phenylene or naphthalene.

4. A liquid crystalline polysiloxane according to claim 3 wherein Ar is naphthalene.

5. A liquid crystalline polysiloxane according to claim 4 wherein X is chlorine or methyl.

6. A liquid crystalline polysiloxane according to claim 5 wherein R is selected from the group consisting of ethyl, n-propyl, isopropyl, n-butyl, 1-methylpropyl and 2-methylpropyl.

7. A liquid crystalline polysiloxane according to claim 6 wherein R is selected from the group consisting of ethyl, 1-methylpropyl and 2-methylpropyl.

8. A liquid crystalline polysiloxane according to claim 4 wherein Ar' is phenylene.

9. A liquid crystalline polysiloxane according to claim 8 wherein X is chlorine or methyl.

10. A liquid crystalline polysiloxane according to claim 9 wherein R is $C_2$–$C_4$ alkyl.

11. A liquid crystalline polysiloxane according to claim 10 wherein R is selected from the group consisting of ethyl, 1-methylpropyl and 2-methylpropyl.

12. A liquid crystalline polysiloxane according to claim 9 wherein X is chlorine.

13. A liquid crystalline polysiloxane according to claim 12 wherein R is 1-methylpropyl or 2-methylpropyl.

14. A liquid crystalline polysiloxane according to claim 4 wherein Ar' is naphthalene.

15. A liquid crystalline polysiloxane according to claim 14 wherein X is chlorine or methyl.

16. A liquid crystalline polysiloxane according to claim 15 wherein R is methyl, ethyl, propyl or isopropyl.

17. A liquid crystalline polysiloxane according to claim 16 wherein R is ethyl.

18. A liquid crystalline polysiloxane according to claim 14 wherein X is methyl.

19. A liquid crystalline polysiloxane according to claim 18 wherein R is ethyl.

20. A liquid crystalline polysiloxane according to claim 1 wherein Ar is biphenylene.

21. A liquid crystalline polysiloxane according to claim 20 wherein Ar' is naphthalene.

22. A liquid crystalline polysiloxane according to claim 20 wherein X is methyl.

23. A liquid crystalline polysiloxane according to claim 22 wherein R is methyl, ethyl or propyl.

24. A liquid crystalline polysiloxane according to claim 23 wherein R is ethyl.

25. A liquid crystalline polysiloxane according to claim 20 wherein X is chlorine.

26. A liquid crystalline polysiloxane according to claim 25 wherein R is ethyl.

27. A liquid crystalline compound having the following formula:

$$H_2C=CH\text{--}(CH_2)_n\text{--}O\text{--}Ar\text{--}C(=O)\text{--}O\text{--}Ar'\text{--}C(=O)\text{--}O\text{--}CH_2\text{--}CH(X)\text{--}R$$

wherein n is an integer of 1 to 12;
Ar' is phenylene or naphthalene;
Ar is phenylene, biphenylene or naphthalene provided that Ar is not biphenylene and is not phenylene when Ar' is phenylene;
X is halogen or methyl; and
R is $C_1$–$C_4$ alkyl.

28. A liquid crystalline polysiloxane according to claim 27 wherein n is an integer of 1 to 9.

29. A liquid crystalline polysiloxane according to claim 27 wherein Ar is phenylene or naphthalene.

30. A liquid crystalline polysiloxane according to claim 29 wherein Ar is naphthalene.

31. A liquid crystalline polysiloxane according to claim 30 wherein X is chlorine or methyl.

32. A liquid crystalline polysiloxane according to claim 31 wherein R is selected from the group consisting of ethyl, n-propyl, isopropyl, n-butyl, 1-methylpropyl and 2-methylpropyl.

33. A liquid crystalline polysiloxane according to claim 32 wherein R is selected from the group consisting of ethyl, 1-methylpropyl and 2-methylpropyl.

34. A liquid crystalline polysiloxane according to claim 30 wherein Ar' is phenylene.

35. A liquid crystalline polysiloxane according to claim 34 wherein X is chlorine or methyl.

36. A liquid crystalline polysiloxane according to claim 35 wherein R is $C_2$–$C_4$ alkyl.

37. A liquid crystalline polysiloxane according to claim 36 wherein R is selected from the group consisting of n-butyl, 1-methylpropyl and 2-methylpropyl.

38. A liquid crystalline polysiloxane according to claim 35 wherein X is chlorine.

39. A liquid crystalline polysiloxane according to claim 38 wherein R is 1-methylpropyl or 2-methylpropyl.

40. A liquid crystalline polysiloxane according to claim 30 wherein Ar' is naphthalene.

41. A liquid crystalline polysiloxane according to claim 40 wherein X is chlorine or methyl.

42. A liquid crystalline polysiloxane according to claim 41 wherein R is methyl, ethyl, propyl or isopropyl.

43. A liquid crystalline polysiloxane according to claim 42 wherein R is ethyl.

44. A liquid crystalline polysiloxane according to claim 40 wherein X is methyl.

45. A liquid crystalline polysiloxane according to claim 44 wherein R is ethyl.

46. A liquid crystalline polysiloxane according to claim 27 wherein Ar is biphenylene.

47. A liquid crystalline polysiloxane according to claim 46 wherein Ar' is naphthalene.

48. A liquid crystalline polysiloxane according to claim 46 wherein X is methyl.

49. A liquid crystalline polysiloxane according to claim 48 wherein R is methyl, ethyl or propyl.

50. A liquid crystalline polysiloxane according to claim 49 wherein R is ethyl.

51. A liquid crystalline polysiloxane according to claim 46 wherein X is chlorine.

52. A liquid crystalline polysiloxane according to claim 51 wherein R is ethyl.

* * * * *

UNITED STATES PATENT AND TRADEMARK OFFICE
CERTIFICATE OF CORRECTION

PATENT NO. : 5,495,037
DATED : February 27, 1996
INVENTOR(S) : Hsu et al.

It is certified that error appears in the above-indentified patent and that said Letters Patent is hereby corrected as shown below:

Col. 1, line 48, delete "No. 2,305-318" and insert therefore -- No. 2, 305,318 --.

Col. 3, line 37, delete "64.7%" and insert therefore -- 64.7°C --.

Col. 3, line 39, delete "157.5%" and insert therefore -- 157.5°C --.

Col. 3, line 43, delete "67.3%" and insert therefore -- 67.3°C --.

Col. 3, line 45, delete "25%" and insert therefore -- 25°C --.

Col. 3, line 47, delete "25%" and insert therefore -- 25°C --.

Col. 3, line 50, delete "66.3%" and insert therefore -- 66.3°C --.

Col. 4, line 10, delete "smectic." and insert therefore -- smectic --.

Col. 4, line 28, delete "R:" and insert therefore -- R --.

UNITED STATES PATENT AND TRADEMARK OFFICE
CERTIFICATE OF CORRECTION

PATENT NO. : 5,495,037
DATED : February 27, 1996
INVENTOR(S) : Hsu et al.

It is certified that error appears in the above-indentified patent and that said Letters Patent is hereby corrected as shown below:

Col. 5, line 14, following "Nicolet" delete ":".

Col. 6, line 7, delete "7.36" and insert therefore -- 7.86 --.

Col. 6, line 27, delete "I3.98" and insert therefore -- 13.98 --.

Col. 6, line 37, following "Synthesis of" insert ":".

Col. 6, line 39, following "(I-4)" insert ".".

Col. 6, line 66, following "Synthesis of" insert ":".

Col. 6, line 68, following "(I-6)" insert ".".

Col. 7, line 16, delete "-90%" and insert therefore -- 90% --.

Col. 7, line 28, following "Synthesis of" insert ":".

Col. 7, line 58, following "Synthesis of" insert ":".

UNITED STATES PATENT AND TRADEMARK OFFICE
CERTIFICATE OF CORRECTION

PATENT NO. : 5,495,037
DATED : February 27, 1996
INVENTOR(S) : Hsu et al.

It is certified that error appears in the above-indentified patent and that said Letters Patent is hereby corrected as shown below:

Col. 7, line 66, delete "2naphthoate" and insert therefore -- 2-naphthoate --.

Col. 8, line 25, delete "mixture;" and insert therefore -- mixture --.

Col. 8, line 27, delete "78,6%" and insert therefore -- 78.6% --.

Col. 8, line 41, following "CHCl-)" insert ",".

Col. 8, line 44, delete "(AG-m," and insert therefore -- (AB-m, --.

Col. 8, line 53, delete "$CH_1$" and insert therefore -- $CH_2$ --.

Col. 8, line 54, immediately prior to "m,10H, ArH)" insert "(".

Col. 9, line 28, delete "cut" and insert therefore -- out --.

Col. 9, line 62, delete "I-13:to" and insert therefore -- I-13 to --.

UNITED STATES PATENT AND TRADEMARK OFFICE
CERTIFICATE OF CORRECTION

PATENT NO. : 5,495,037
DATED : February 27, 1996
INVENTOR(S) : Hsu et al.

It is certified that error appears in the above-indentified patent and that said Letters Patent is hereby corrected as shown below:

Col. 10, line 1, following "the" delete ",".

Col. 10, line 9, following "presented" delete "5".

Col. 11, Table 5, line 29, delete "Kcal/mol" and insert therefore -- Kcal/mru --.

Col. 12, line 15, delete "(m,14N," and insert therefore -- (m,14H, --.

Col. 12, line 16, delete "$CH_3$" and insert therefore -- $CH_2$ --.

Col. 12, line 18, delete "5.00" and insert therefore -- 5.90 --.

Col. 12, line 18, delete "CH,)" and insert therefore -- $CH_2$) --.

Col. 12, line 23, following "Synthesis of" insert ":".

Col. 12, line 32, delete "KI" and insert therefore -- K1 --.

UNITED STATES PATENT AND TRADEMARK OFFICE
CERTIFICATE OF CORRECTION

PATENT NO. : 5,495,037
DATED : February 27, 1996
INVENTOR(S) : Hsu et al.

It is certified that error appears in the above-indentified patent and that said Letters Patent is hereby corrected as shown below:

Col. 12, line 34, delete "compound 1-16" and insert therefore -- compound I-16 --.

Col. 12, line 47, delete "(t,2H,-CH=O-)" and insert therefore -- (t,2H,-CH$_2$O-) --.

Col. 13, line 4, following "CDCL$_3$" delete ")".

Col. 14, line 9, delete "carboxylic acid," and insert therefore -- carboxylic acid. --.

Col. 14, line 12, delete "m,1H,CH=" and insert therefore -- m,1H,-CH= --.

Col. 14, line 14, delete --$^1$H-MMR" and insert therfore --$^1$H-NMR--

Col. 15, Table 7, in the formula, delete "C$_2$H$_5$" and insert therefore -- C$_2$H$_6$ --.

Col. 15, Table 7, 8 lines under the heading, delete "-CH$_3$-" and insert therefore -- -CH$_2$- --.

UNITED STATES PATENT AND TRADEMARK OFFICE
CERTIFICATE OF CORRECTION

PATENT NO. : 5,495,037
DATED : February 27, 1996
INVENTOR(S) : Hsu et al.

It is certified that error appears in the above-indentified patent and that said Letters Patent is hereby corrected as shown below:

Col. 18, line 46, delete "number of the," and insert therefore -- number of the --.

Col. 19, line 14, delete "I-2.9" and insert therefore -- I-29 --.

Col. 19, line 40, delete "arid" and insert therefore -- and --.

Col. 20, line 12, delete "titan" and insert therefore -- than --.

Col. 22, line 47, delete "claim." and insert therefore -- claim --.

Signed and Sealed this

Fourth Day of June, 1996

BRUCE LEHMAN

Attest:

Attesting Officer          Commissioner of Patents and Trademarks